(12) United States Patent
Kawabata

(10) Patent No.: US 9,369,595 B2
(45) Date of Patent: Jun. 14, 2016

(54) IMAGE FORMING APPARATUS FOR BEING ABLE TO UTILIZE APPLICATION IN WHICH WEB BROWSER IS USED

(75) Inventor: Hiroyuki Kawabata, Kawanishi (JP)

(73) Assignee: Konica Minolta Business Technologies, Inc., Chiyoda-ku, Tokyo (JP)

(*) Notice: Subject to any disclaimer, the term of this patent is extended or adjusted under 35 U.S.C. 154(b) by 677 days.

(21) Appl. No.: 13/410,454

(22) Filed: Mar. 2, 2012

(65) Prior Publication Data

US 2012/0233537 A1 Sep. 13, 2012

(30) Foreign Application Priority Data

Mar. 9, 2011 (JP) ................................. 2011-051509

(51) Int. Cl.
*G06F 17/00* (2006.01)
*G06F 15/16* (2006.01)
(Continued)

(52) U.S. Cl.
CPC ........ *H04N 1/00408* (2013.01); *G06F 17/3028* (2013.01); *H04N 1/00464* (2013.01); *G06F 3/1204* (2013.01); *G06F 3/1229* (2013.01); *H04N 1/4413* (2013.01); *H04N 2201/0094* (2013.01)

(58) Field of Classification Search
CPC .... G06F 8/38; G06F 3/1246; G06F 17/30887
USPC ............................... 715/234; 711/118; 714/57
See application file for complete search history.

(56) References Cited

U.S. PATENT DOCUMENTS 7,739,133 B1 * 6/2010 Hail ...................... G06Q 40/00
 705/2
7,765,248 B2 * 7/2010 Kanasaki ............ G06F 17/3089
 358/1.15

(Continued)

FOREIGN PATENT DOCUMENTS

JP 2006-192878 A 7/2006
JP 2009-188583 A 8/2009

(Continued)

OTHER PUBLICATIONS

Geegdrop.com, Bypass your Browser, Mar. 7, 2011, pp. 1-6 http://geekdrop.com/content/how-to-temporarily-bypass-your-browsers-cache-to-see-the-latest-version-of-page.*

(Continued)

*Primary Examiner* — Scott Baderman
*Assistant Examiner* — Mario M Velez-Lopez
(74) *Attorney, Agent, or Firm* — Buchanan Ingersoll & Rooney PC

(57) ABSTRACT

An image forming apparatus accesses a server that provides a Web application to enable Web application to be utilized. The image forming apparatus receives an instruction to utilize the Web application, and acquires a document expressing a Web page of the Web application in response to the received instruction. The image forming apparatus determines whether a previously-set fixed name is included in a URI (Uniform Resource Identifier) included in the acquired document. When it is determined that the fixed name is included in the URI, the image forming apparatus acquires data correlating to the URI from a predetermined location previously correlated to the fixed name. Using the acquired data, the image forming apparatus generates a display screen of the Web application based on the document.

17 Claims, 13 Drawing Sheets

(51) Int. Cl.
   H04N 1/00 (2006.01)
   G06F 17/30 (2006.01)
   G06F 3/12 (2006.01)
   H04N 1/44 (2006.01)

(56) References Cited

U.S. PATENT DOCUMENTS

| | | | | |
|---|---|---|---|---|
| 8,504,543 | B1* | 8/2013 | Andreessen | H04L 67/02 707/705 |
| 8,589,945 | B2* | 11/2013 | Rodgers | G06F 9/44521 711/118 |
| 8,713,644 | B2* | 4/2014 | Krishna | G06F 21/34 726/4 |
| 9,077,825 | B2* | 7/2015 | Sato | H04N 1/00244 |
| 2002/0032839 | A1* | 3/2002 | Yamamoto | G06F 17/30902 711/118 |
| 2005/0187941 | A1* | 8/2005 | Kanasaki | G06F 17/3089 |
| 2006/0129912 | A1* | 6/2006 | Kunori | G06F 21/608 715/205 |
| 2009/0138870 | A1* | 5/2009 | Shahindoust | G06F 8/65 717/172 |
| 2009/0254601 | A1* | 10/2009 | Moeller | G06F 9/542 709/201 |
| 2009/0327306 | A1* | 12/2009 | Finger | G06F 17/30 |
| 2010/0107152 | A1* | 4/2010 | Kwon | G06F 8/60 717/174 |
| 2010/0149592 | A1* | 6/2010 | Yoshida | H04N 1/00352 358/1.15 |
| 2010/0161808 | A1* | 6/2010 | Kwon | G06F 9/5027 709/227 |
| 2011/0060951 | A1* | 3/2011 | Sako | H04N 1/00411 714/57 |
| 2011/0173250 | A1* | 7/2011 | Sato | H04N 1/00244 709/203 |
| 2011/0320818 | A1* | 12/2011 | Krishna | G06F 21/34 713/175 |
| 2012/0030585 | A1* | 2/2012 | Akuzawa | G06F 3/0481 715/747 |
| 2012/0206757 | A1* | 8/2012 | Kawabata | H04L 67/02 358/1.14 |
| 2012/0233537 | A1* | 9/2012 | Kawabata | H04N 1/00408 715/234 |
| 2013/0014017 | A1* | 1/2013 | Sato | H04N 1/00503 715/733 |

FOREIGN PATENT DOCUMENTS

JP   2010-128994 A   6/2010
WO   WO 98/24027 A1   6/1998

OTHER PUBLICATIONS

Martin Löfberg et al. "Web vs. Standalone Application", Jun. 2005, pp. 1-36.*

Extended Search Report issued Apr. 22, 2014 by the European Search Report, in corresponding European Patent Application No. 12158377.7 (7 pages).

* cited by examiner

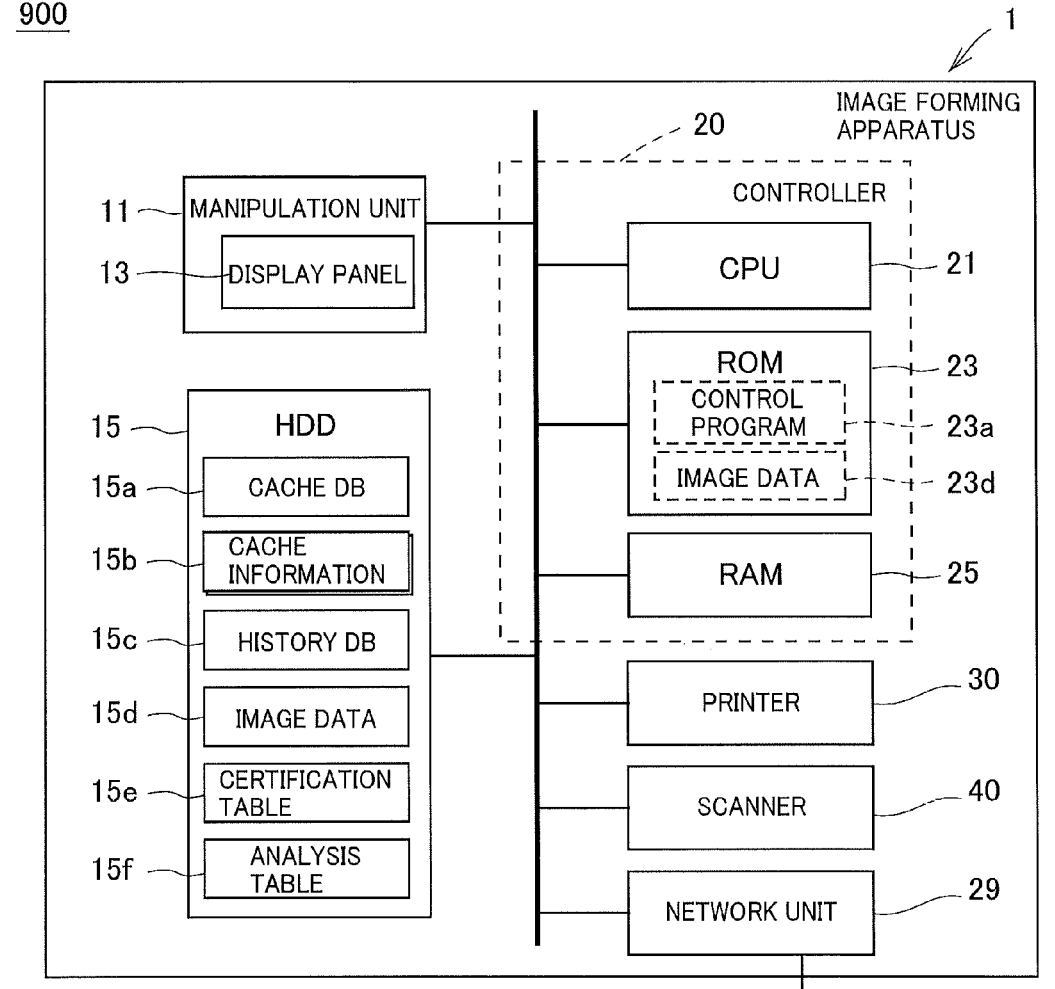
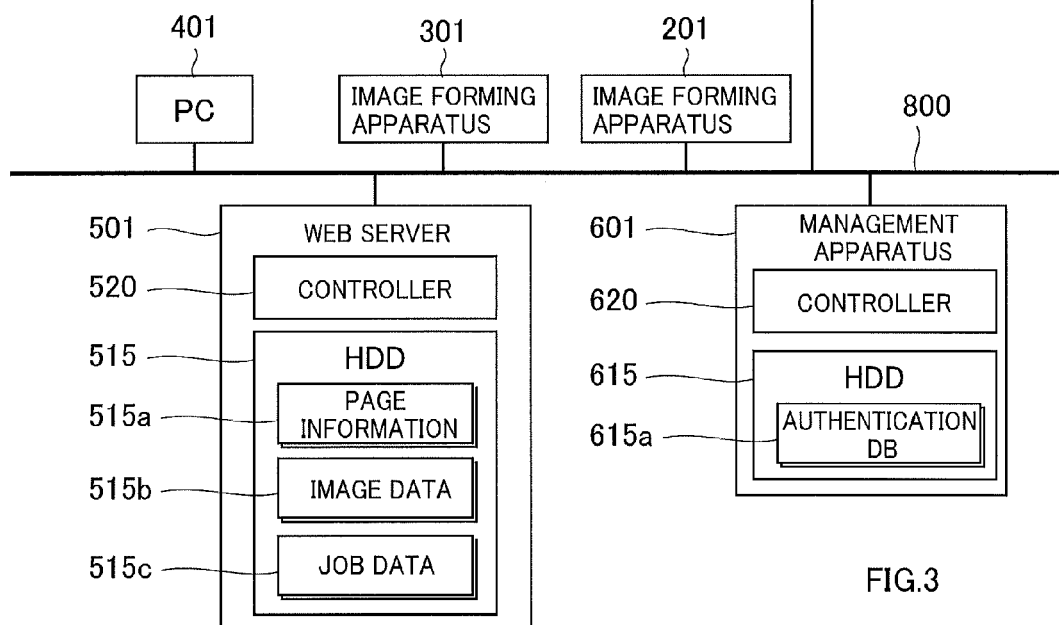
FIG.3

| FIXED NAME | LOCATION OF IMAGE DATA |
|---|---|
| /km/ | /rom/panel/img/km/ (ROM) |
| /ap1/ | /hdd/app/ap1/ (HDD) |
| /ap2/ | /hdd/app/ap2/ (HDD) |

FIG.15
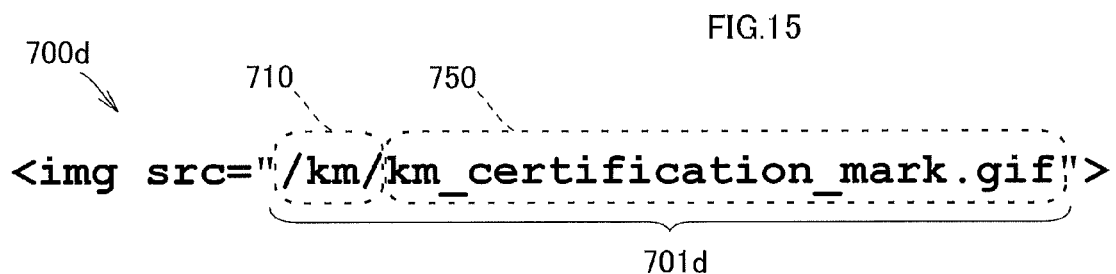
FIG.16
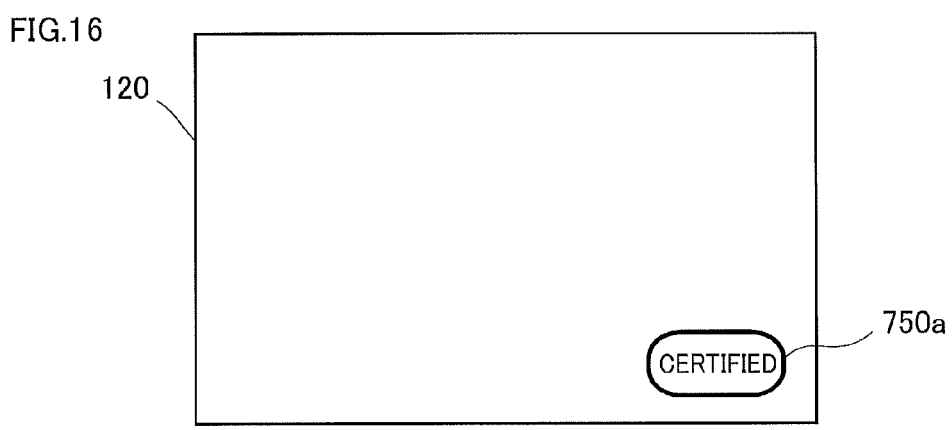
FIG.17
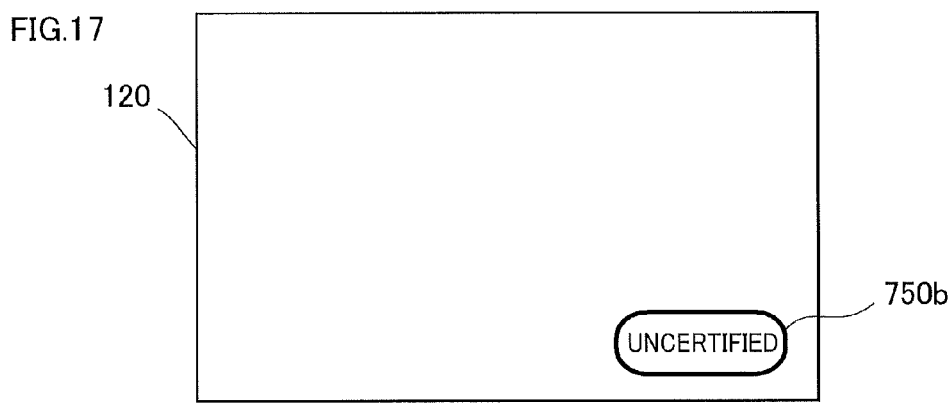
FIG.18
|  | km_certification_mark.gif |
|---|---|
| CERTIFIED | certified.gif |
| UNCERTIFIED | uncertified.gif |

| FIXED NAME | LOCATION OF IMAGE DATA |
|---|---|
| /km/ | http://192.168.0.100/km/ |
| /ap1/ | /hdd/app/ap1/        (HDD) |
| /ap2/ | /hdd/app/ap2/        (HDD) |

IMAGE FORMING APPARATUS FOR BEING ABLE TO UTILIZE APPLICATION IN WHICH WEB BROWSER IS USED

This application is based on Japanese Patent Application No. 2011-051509 filed with the Japan Patent Office on Mar. 9, 2011, the entire content of which is hereby incorporated by reference.

BACKGROUND OF THE INVENTION

1. Field of the Invention

The present invention relates to an image forming apparatus and an image forming system, particularly to an image forming apparatus and an image forming system for being able to utilize an application in which a Web browser is used.

2. Description of the Related Art

There is known an image forming system including an image forming apparatus (such as an MFP (Multi-Function Peripheral) including a scanner function, a facsimile function, a printer function, a data communication function, and a server function, a facsimile machine, a copying machine, and a printer, and the like) and a Web server that provides a Web application. In the image forming system, the Web application provided by the Web server can be utilized using the image forming apparatus by accessing the Web server from the image forming apparatus.

During the use of the Web application, the image forming apparatus acquires data utilized when using the Web application (for example, document data or image data of a Web page) from the Web server similarly to a usual browse of the Web page. Based on the acquired data, the image forming apparatus displays the Web page relating to the Web application to enable the Web application to be utilized.

The Web application is displayed as the Web page. A UI (User Interface) of the Web application can freely be set by a vender of the Web application. The vender can easily set the UI, which a user can easily utilize, in each Web application. Therefore, the user can easily utilize the Web application.

Japanese Patent Laying-Open No. 2006-192878 discloses a technology in which, after an initial screen is displayed by a Web browser function in the image forming apparatus, and access is restricted by invalidating a link to another Web page.

Japanese Domestic Re-publication of PCT International Publication for Patent Application No. 98/024027 discloses a Web cache storage device, in which cache and a Web cache management table are contained in a DVD-RAM and browsing work can smoothly be continued with a browser device by inserting the DVD-RAM in the browser device.

In the case that the UI of the Web application differs from a UI of an application (built-in application) that can originally be used in the image forming apparatus or a UI of another Web application, uniformity of the UI is lost in a whole extent of the image forming apparatus. In the state in which the uniformity of the UI is lost in the whole extent of the image forming apparatus, there is a high possibility that the user is confused. For example, Web applications or built-in applications differ from each other in a button image corresponding to the same function. In this case, the user needs to pay attention to the UI in order to unmistakably perform a manipulation, which degrades convenience of the image forming system.

When the applications retain an image common to each other, the uniformity of the UI can be enhanced in the whole extent of the image forming apparatus. However, in this case, it is necessary to capture an image in each application, which results in a problem in that a load on a network constituting the image forming system is increased.

Japanese Patent Laying-Open No. 2006-192878 and Japanese Domestic Re-publication of PCT International Publication for Patent Application No. 98/024027 disclose no effective countermeasure against the problem relating to the UI of the image forming apparatus.

SUMMARY OF THE INVENTION

The invention is devised in order to solve the above problems, and an object of the invention is to provide an image forming apparatus and an image forming system for being able to easily maintain the uniformity of the UI of the image forming apparatus.

In order to achieve the above object, according to an aspect of the invention, an image forming apparatus that accesses a server, which provides a Web application, to enable the Web application to be utilized, the image forming apparatus includes: a receiving unit for receiving an instruction to utilize the Web application; a document acquisition unit for acquiring a document expressing a Web page of the Web application in response to the instruction received by the receiving unit; an analysis unit for analyzing whether a previously-set fixed name is included in a URI (Uniform Resource Identifier) included in the document acquired by the document acquisition unit; a data acquisition unit for acquiring data correlating to the URI from a predetermined location previously correlated to the fixed name when the analysis unit determines that the fixed name is included in the URI; and a generator for generating a display screen of the Web application based on the document using the data acquired by the data acquisition unit.

According to another aspect of the invention, an image forming system includes: the image forming apparatus described above; and a server for providing a Web application, wherein the Web application can be utilized through the image forming apparatus that accesses the server.

According to still another aspect of the invention, an image forming system includes: an image forming apparatus; and a server for providing a Web application, the Web application being able to be utilized through the image forming apparatus that accesses the server, wherein the image forming apparatus includes: a registration unit for registering the Web application provided by the server; a storage for acquiring at least part of data, which is not stored in the image forming apparatus in data used in the Web application, when the registration unit registers the Web application, and storing the at least part of data in the image forming apparatus; a name setting unit for setting a fixed name relating to the Web application registered by the registration unit while correlating the fixed name to a location in which the data is stored by the storage; a receiving unit for receiving an instruction to utilize the Web application; a document acquisition unit for acquiring a document expressing a Web page of the Web application from the server in response to the instruction received by the receiving unit; an analysis unit for analyzing whether the fixed name set by the name setting unit is included in a URI (Uniform Resource Identifier) included in the document acquired by the document acquisition unit; a data acquisition unit for acquiring data correlating to the URI from the storage location of the data correlated to the fixed name when the analysis unit determines that the fixed name is included in the URI; and a generator for generating a display screen of the Web application based on the document using the data acquired by the data acquisition unit, the server includes: an instruction unit for issuing an instruction relating to the fixed name that should be set by the name setting unit to the image forming apparatus based on the URI relating to data stored in the image forming apparatus by the storage in the URIs included in the document expressing the Web page of the Web application when the registration unit registers the Web application in the image forming apparatus, and the name setting unit sets the fixed name based on an instruction contents of the instruction unit.

According to still another aspect of the invention, an image forming system includes: an image forming apparatus; and a server for providing a Web application, the Web application being able to be utilized through the image forming apparatus that accesses the server, wherein the image forming apparatus includes: a registration unit for registering the Web application provided by the server; a storage for acquiring at least part of data, which is not stored in the image forming apparatus in data used in the Web application, when the registration unit registers the Web application, and storing the at least part of data in the image forming apparatus; a name setting unit for setting a fixed name relating to the Web application registered by the registration unit while correlating the fixed name to a location in which the data is stored by the storage; a receiving unit for receiving an instruction to utilize the Web application; a document acquisition unit for acquiring a document expressing a Web page of the Web application from the server in response to the instruction received by the receiving unit; an analysis unit for analyzing whether the fixed name set by the name setting unit is included in a URI (Uniform Resource Identifier) included in the document acquired by the document acquisition unit; a data acquisition unit for acquiring data correlating to the URI from the storage location of the data correlated to the fixed name when the analysis unit determines that the fixed name is included in the URI; and a generator for generating a display screen of the Web application based on the document using the data acquired by the data acquisition unit, the name setting unit, when setting the fixed name, transmits information on the set fixed name to the server, the server includes: a name acquisition unit for acquiring the information of the fixed name transmitted from the name setting unit; and a document changing unit for changing the document expressing the Web page of the Web application based on the information acquired by the name acquisition unit, and the document changing unit changes the URI relating to data stored in the image forming apparatus by the storage in the URIs included in the document such that the fixed name is included in the URI relating to the data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram illustrating a hardware configuration of each piece of apparatus of the image forming system;

FIG. 15 is a view illustrating a URI included in page information in a second embodiment.

FIG. 16 is a view illustrating an example of a display image of the certified Web application.

FIG. 17 is a view illustrating an example of a display image of the uncertified Web application.

FIG. 18 is a view illustrating a certified logo image.

DESCRIPTION OF THE PREFERRED EMBODIMENTS

Hereinafter, an image forming system according to an exemplary embodiment of the invention will be described with reference to the drawings.

[Outline]

The image forming system includes a server apparatus that acts as a Web server and an image forming apparatus. The server and each of the image forming apparatuses are connected through a network while being able to conduct communication with each other. A PC (Personal computer) that used by a user and a management apparatus that provides directory service are also connected to the network.

The image forming apparatus is a multi-function peripheral (MFP) provided with the scanner function, copying function, function as a printer, facsimile transmitting/receiving function, data communicating function, and server function. With the scanner function, the image forming apparatus reads an image from a document which has been set, and stores the read image in a hard disk drive (HDD) or the like. With the copying function, the device further prints the image on a sheet of paper or the like. With the function as a printer, on receipt of a print instruction from an external terminal such as a personal computer (PC), the device prints an image on a sheet of paper on the basis of the instruction. With the facsimile transmitting/receiving function, the device receives facsimile data from an external facsimile machine or the like and stores the data in a HDD or the like. With the data communicating function, the device transmits data to or receives data from an external device connected thereto. With the server function, the device allows a plurality of users to share, e.g., data stored in a HDD or the like.

The image forming apparatus has a Web browser function of accessing the server to display a Web page provided from the server. In the exemplary embodiment, the server apparatus is configured to be able to provide a Web application. Using the Web browser function, the image forming apparatus accesses the server to acquire information on a Web application, and display the Web page. Therefore, the image forming apparatus enables the Web application to be utilized.

In the image forming system, the Web application that is utilized in the image forming apparatus is registered in the image forming apparatus. The image forming apparatus analyzes whether a previously-set fixed name is included in a URI (Uniform Resource Identifier) included in a document indicating the Web page of the Web application. When the fixed name is included in the URI, the image forming apparatus acquires data correlating to a predetermined location that is previously correlated to the fixed name. Therefore, the image common to other applications can easily be used as the data for the image constituting the UI of the Web application. Accordingly, the uniformity of the UI can easily be maintained in the image forming apparatus.

First Embodiment

Figure 1:
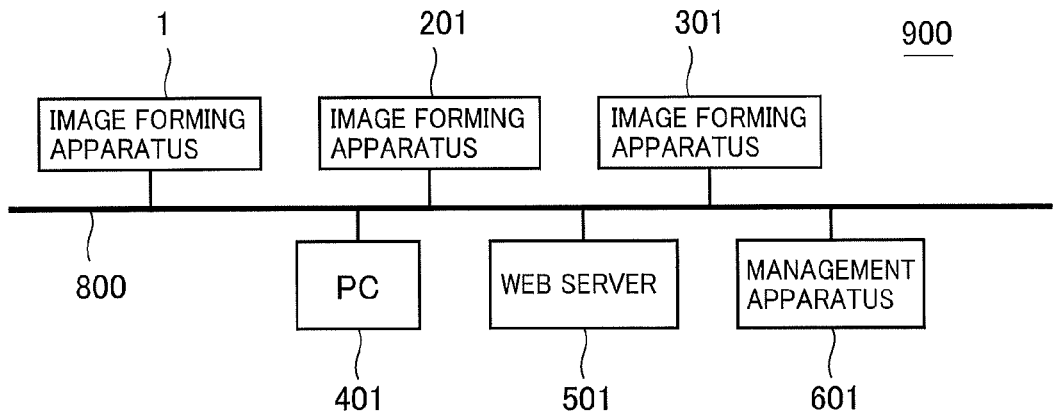
FIG. 1 is a block diagram illustrating a configuration of an image forming system according to a first embodiment of the invention.

FIG. 1 is a block diagram illustrating a configuration of an image forming system according to a first embodiment of the invention.

Referring to FIG. 1, an image forming system 900 includes three image forming apparatuses 1, 201, and 301, a client PC (hereinafter sometimes referred to as a PC) 401, a Web server (an example of the server) 501, and a management apparatus 601.

Image forming apparatuses 1, 201, and 301, Web server 501, PC 401, and management apparatus 601 are connected to a network 800. For example, network 800 is a LAN (Local Area Network). Image forming apparatuses 1, 201, and 301, Web server 501, PC 401, and management apparatus 601 can conduct communication with one another. Each apparatus may be connected to network 800 through a LAN cable or what is called a wireless LAN.

Image forming apparatuses 201 and 301 have the same configuration as image forming apparatus 1. Image forming apparatuses 201 and 301 may have the configuration different from that of image forming apparatus 1.

[Configuration of Image Forming Apparatus 1]

Figure 2:
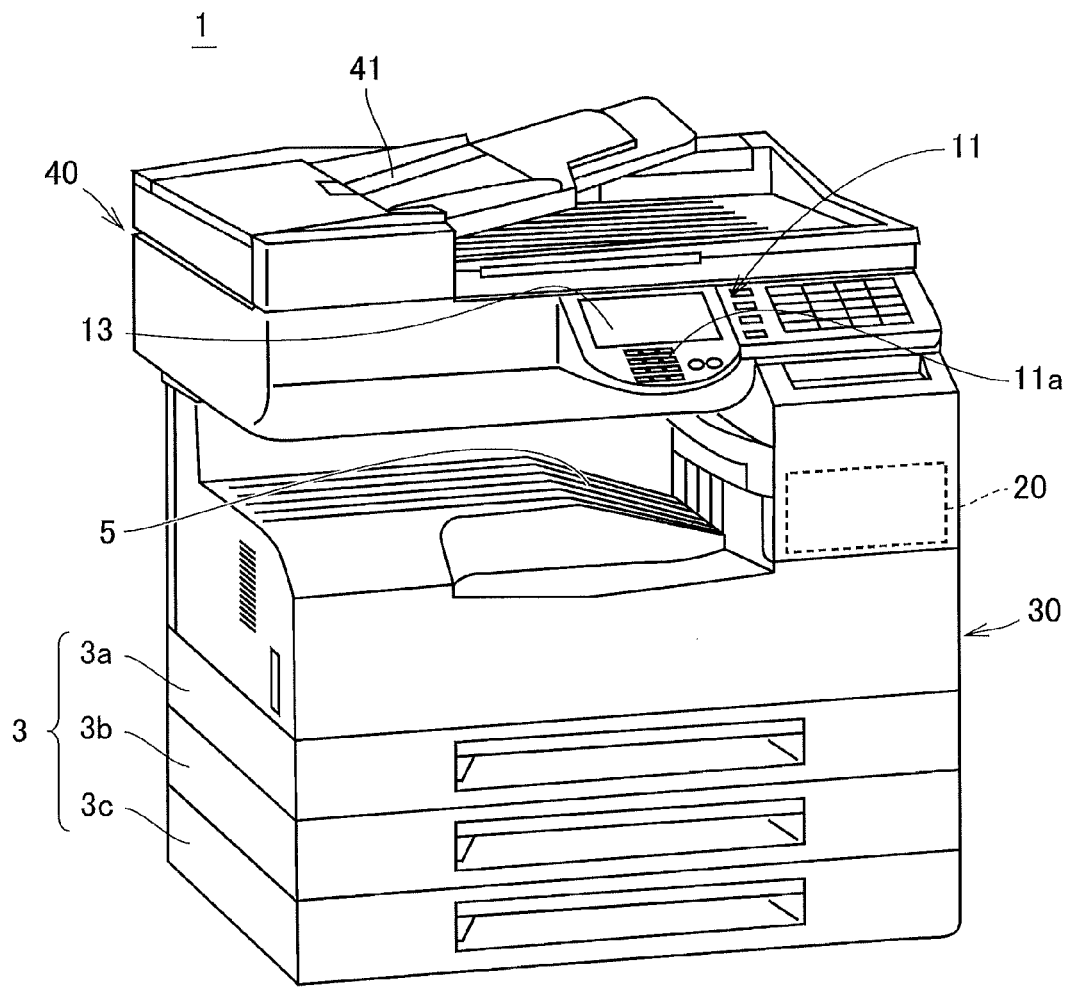
FIG. 2 is a perspective view illustrating an image forming apparatus.

FIG. 2 is a perspective view illustrating image forming apparatus 1.

Referring to FIG. 2, image forming apparatus 1 includes a sheet feed cassette 3, a sheet discharge tray 5, a manipulation unit 11, a controller 20, a printer 30, and a scanner 40. Controller 20 includes a CPU 21 (see FIG. 3) and controls an operation of image forming apparatus 1. Controller 20 and printer 30 are disposed in a chassis of image forming apparatus 1.

Image forming apparatus 1 includes three sheet-feed cassettes 3 (sheet-feed cassettes 3a, 3b, and 3c). For example, sheets having different sizes (such as a B5 size, an A4 size and an A3 size) are loaded on sheet-feed cassettes 3. Sheet-feed cassettes 3 are disposed in a lower portion of image forming apparatus 1 while being able to be inserted in and taken out from the chassis of image forming apparatus 1. During the print, the sheets loaded in each sheet-feed cassette 3 are fed one by one and delivered to printer 30. The number of sheet-feed cassettes 3 is not limited to three, but the number of sheet-feed cassettes 3 may be larger or smaller than three.

In the chassis of image forming apparatus 1, sheet discharge tray 5 is disposed above a region in which printer 30 is accommodated and below a region in which scanner 40 is disposed. The sheet in which the image is formed by printer 30 is discharged to sheet discharge tray 5 from an inside of the chassis.

Manipulation unit 11 is disposed on a front (front surface in FIG. 2) side in an upper portion of image forming apparatus 1. A plurality of manipulation buttons 11a that can be pressed by a user are disposed in manipulation unit 11. A display panel 13 that displays information to the user is disposed in manipulation unit 11. For example, display panel 13 is an LCD (Liquid Crystal Display) provided with a touch panel. Display panel 13 displays a guide screen to the user and a manipulation button, and receives a touch manipulation from the user. Display panel 13 performs the display under the control of CPU 21. Manipulation unit 11 receives a manipulation input from the user. When the user manipulates manipulation button 11a or display panel 13, manipulation unit 11 transmits a manipulation signal or a predetermined command corresponding to the manipulation to CPU 21. That is, the user can cause image forming apparatus 1 to perform various operations by manipulating manipulation unit 11.

Printer 30 generally includes a toner image forming unit (not illustrated), a sheet conveying unit (not illustrated), and a fixing device (fixing device). Printer 30 forms the image in the sheet by an electrophotographic method in which a toner image formed by the toner image forming unit is transferred to the sheet.

The sheet conveying unit is constructed by a sheet feed roller, a conveying roller, and a motor that drives the sheet feed roller and the conveying roller. In the sheet conveying unit, the sheet is fed from sheet-feed cassette 3 and conveyed in the chassis of image forming apparatus 1. The sheet conveying unit discharges the sheet in which the image is formed to sheet discharge tray 5 from the chassis of image forming apparatus 1.

The toner image forming unit includes a photosensitive body, a development device, an exposure device, and a transfer roller. The toner image forming unit forms the toner image that is formed in the sheet, and transfers the toner image to the sheet conveyed by the sheet conveying unit.

The fixing device includes a heating roller and a pressurizing roller. The fixing device conveys the sheet in which the image is formed while the sheet is nipped between the heating roller and the pressurizing roller, and heats and pressurizes the sheet. Therefore, the fixing device melts toner adhering to the sheet, and fixes the toner to the sheet to form the image in the sheet.

Scanner 40 is disposed in the upper portion of the chassis of image forming apparatus 1. Scanner 40 includes an ADF (Auto Document Feeder) 41. Scanner 40 performs the scanner function. In scanner 40, a manuscript disposed on a transparent manuscript stage is scanned with a contact image sensor and read as image data. In scanner 40, the pieces of image data of the plurality of manuscripts are read while the manuscripts set in a manuscript tray are sequentially taken in by the ADF 41.

FIG. 3 is a block diagram illustrating a hardware configuration of each piece of apparatus of image forming system 900.

Referring to FIG. 3, image forming apparatus 1 includes an HDD 15 and a network unit 29 in addition to the above units. Each unit of image forming apparatus 1 is connected to a system bus. Controller 20 can conduct communication with each unit of image forming apparatus 1.

Data of a print job transmitted from an outside through network unit 29 and the image data read by scanner 40 are stored in HDD 15. Setting information on image forming apparatus 1 and a control program for performing various operations of image forming apparatus 1 are stored in HDD 15. A plurality of print jobs transmitted from one PC 401 or a plurality of PCs can be stored in HDD 15.

For example, a cache database (DB) 15a, cache information 15b, and a history database 15c are stored in HDD 15. These pieces of information are generated and stored based on a Web browser function. Additionally, image data 15d, a certification table 15e, and an analysis table 15f are stored in HDD 15. The pieces of information are utilized in performing the Web application function as described later.

For example, network unit 29 is constructed by a combination of a hardware unit such as an NIC (Network Interface Card) and a software unit that conducts communication by a predetermined communication protocol. Network unit 29 connects image forming apparatus 1 to network 800. Therefore, image forming apparatus 1 can conduct communication with external devices, such as PC 401 and Web server 501, which are connected to network 800. Image forming apparatus 1 can receive the print job from PC 401 and Web server 501. Image forming apparatus 1 can transmit the image data read by scanner 40 to PC 401, or transmit the image data by an e-mail through a mail server (not illustrated). Network unit 29 may be configured to be able to be connected to network 800 through wireless communication.

Controller 20 includes the CPU 21, a ROM 23, and a RAM 25. Controller 20 is connected to the system bus in conjunction with manipulation unit 11, printer 30, and scanner 40. Therefore, controller 20 and each unit of image forming apparatus 1 are connected to each other so as to be able to transmit and receive the signal.

CPU 21 executes a control program 23a stored in ROM 23 and a control program (not illustrated) stored in RAM 25 or HDD 15. Therefore, CPU 21 controls various operations of image forming apparatus 1. CPU 21 executes control program 23a when the manipulation signal is transmitted from manipulation unit 11 or when the manipulation command is transmitted from PC 401. Therefore, a predetermined function of image forming apparatus 1 is performed according to manipulation unit 11 manipulated by the user.

For example, ROM 23 is a flash ROM (flash memory). The data used to perform the operation of image forming apparatus 1 is stored in ROM 23. Various control programs 23a or image data 23d are stored in ROM 23. Function setting data of image forming apparatus 1 may be stored in ROM 23. CPU 21 reads the data from ROM 23 and writes the data in ROM 23. ROM 23 may be not rewritable.

RAM 25 is a main memory of CPU 21. RAM 25 is used to store necessary data when CPU 21 executes control program 23a.

As described above, scanner 40 performs the scanner function to read the image data from the manuscript. The image data read by the scanner 40 is converted into an application data format by CPU 21, and stored in HDD 15. CPU 21 can transmit the image data stored in HDD 15 to PC 401.

[Configuration of Web Server 501]

Referring to FIG. 3, Web server 501 includes a controller 520 and an HDD 515. Controller 520 includes a CPU (not illustrated), a ROM (not illustrated), and a RAM (not illustrated), and controls Web server 501.

A control program (not illustrated) of Web server 501 and various pieces of information are stored in HDD 515. Controller 520 controls Web server 501 based on the control program, thereby performing the Web server function and other functions of Web server 501. Web server 501 can perform the function as the Web server function and a function as a file server. Web server 501 can perform a function as a transmission server of an electronic mail and a function of transmitting the image through the facsimile.

In the first embodiment, page information (An example of the document indicating the Web page) 515a, image data 515b, and job data 515c are stored in HDD 515. For example, page information 515a is document data described in a markup language such as an HTML (Hyper Text Markup Language). For example, image data 515b is used in the Web page that is displayed based on the page information. For example, job data 515c is data of the print job that can be performed by image forming apparatuses 1, 201, and 301.

[Description of Management Apparatus 601]

Management apparatus 601 is a server that provides directory service such as a LDAP (Lightweight Directory Access Protocol) and an Active Directory (registered trademark). Management apparatus 601 includes a controller 620 and an HDD 615. Controller 620 includes a CPU (not illustrated), a ROM (not illustrated), and a RAM (not illustrated), and controls management apparatus 601.

A control program (not illustrated) of management apparatus 601 and information for providing the directory service are stored in HDD 615. An authentication database 615a is stored in HDD 615. Authentication information for authenticating a user who uses image forming system 900 is managed in authentication database 615a.

[Description of User Authentication]

In the first embodiment, the user can login to image forming apparatus 1 to be able to utilize image forming system 900 using a user authentication function performed through image forming apparatus 1.

The user authentication function is implemented as follows. That is, information on the user to whom the user authentication can be performed and authentication information necessary to authenticate the user are recorded in authentication database 615a while being correlated with each other. For example, the authentication information is a password that is set in each user. Information on the function that can be performed with respect to each user is recorded in authentication database 615a while being correlated with the user.

In the user authentication function, a user authentication screen 61 (see FIG. 4) is presented to the user. User authentication screen 61 is displayed on display panel 13. The user manipulates manipulation unit 11 to input user information (such as an account name) and the password to image forming apparatus 1. When these pieces of information are input to manipulation unit 11, CPU 21 transmits the input pieces of data to management apparatus 601. In management apparatus 601, controller 620 refers to authentication database 615a to determine whether the user is authenticated based on the received pieces of data. When the user is authenticated, management apparatus 601 determines that the user is authenticated, and transmits an authentication result to image forming apparatus 1. Image forming apparatus 1 receives the authentication result to enable the function, which can be performed with respect to the authenticated user, to be performed. At this point, the authenticated user logs in to image forming apparatus 1. Therefore, image forming apparatus 1 can identify the user who uses image forming apparatus 1. Using the user authentication function, the display of display panel 13 and the utilizable function are adapted to the authenticated user to enhance the convenience of image forming apparatus 1. A high security effect is obtained by the use of the user authentication function such that, when the authenticated user exists near image forming apparatus 1, a printed matter is output while being kept away from other users.

Figure 4:
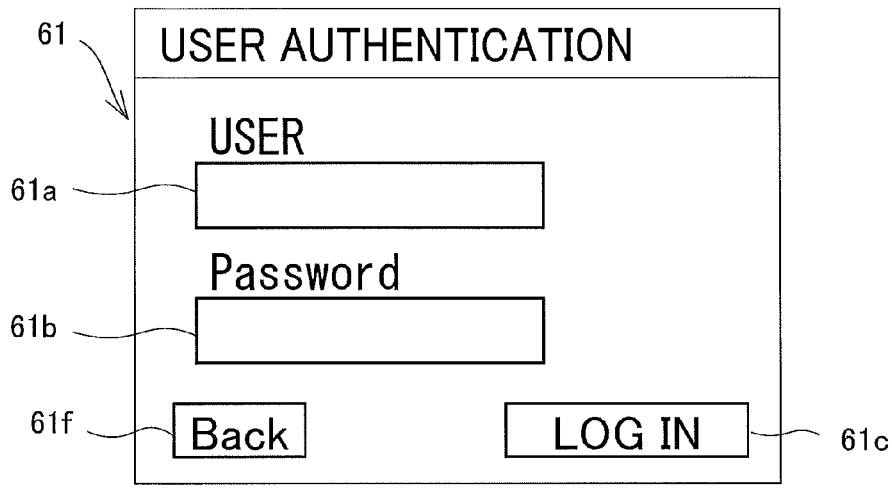
FIG. 4 is a view illustrating an example of a user authentication screen.

FIG. 4 is a view illustrating an example of user authentication screen 61.

Referring to FIG. 4, input areas 61a and 61b, a login button 61c, and a back button 61f are disposed in user authentication screen 61. The account name of the user is input to input area 61a. The password of the user is input to input area 61b. Login button 61c is used to perform the user authentication based on the pieces of data input to input areas 61a and 61b. Back button 61f is used to cause the screen to transition to a usual menu screen of image forming apparatus 1 from user authentication screen 61.

The user properly inputs the account name and the password to input areas 61a and 61b through manipulation unit 11. When the user presses login button 61c, the input pieces of data are transmitted to management apparatus 601. Therefore, the user can perform the user authentication.

Image forming apparatus 1 can authenticate the user who uses image forming apparatus 1 through the user authentication. In image forming apparatus 1, CPU 21 performs management relating to use authority of the user with respect to the function of image forming apparatus 1 according to the identified user. The use of a predetermined function can be restricted in each user by performing the authority management, and the high security effect is obtained.

The user authentication method is not limited to the above method, but a well-known method can properly be adopted. The reference database of the authentication information or the subject that performs the authentication may be different from those of the first embodiment. For example, image forming apparatus 1 may possess the authentication information for performing the user authentication. In this case, image forming apparatus 1 can receive an authentication request from the user, and authenticate the user based on the authentication information. For example, a card authentication method in which a contact or non-contact ID card is used or a biometric authentication method in which fingerprint information or venous information on the user is utilized may be adopted, and the user does not need to input the information on the account name or the password.

The user logs in to image forming system 900 through image forming apparatus 1, and each of the image forming apparatuses 1, 201, and 301 may identify the user who logs in to image forming system 900. The authority management may be performed by the whole of image forming system 900. In this case, for example, management apparatus 601 may provide information on the use authority of the user, such as the function that can be used in image forming system 900 and an accessible point, to each apparatus.

[Description of Pull-Print Function]

In image forming system 900, image forming apparatus 1 can perform print by pull print based on job data 515c stored in Web server 501 (pull-print function).

Figure 5:
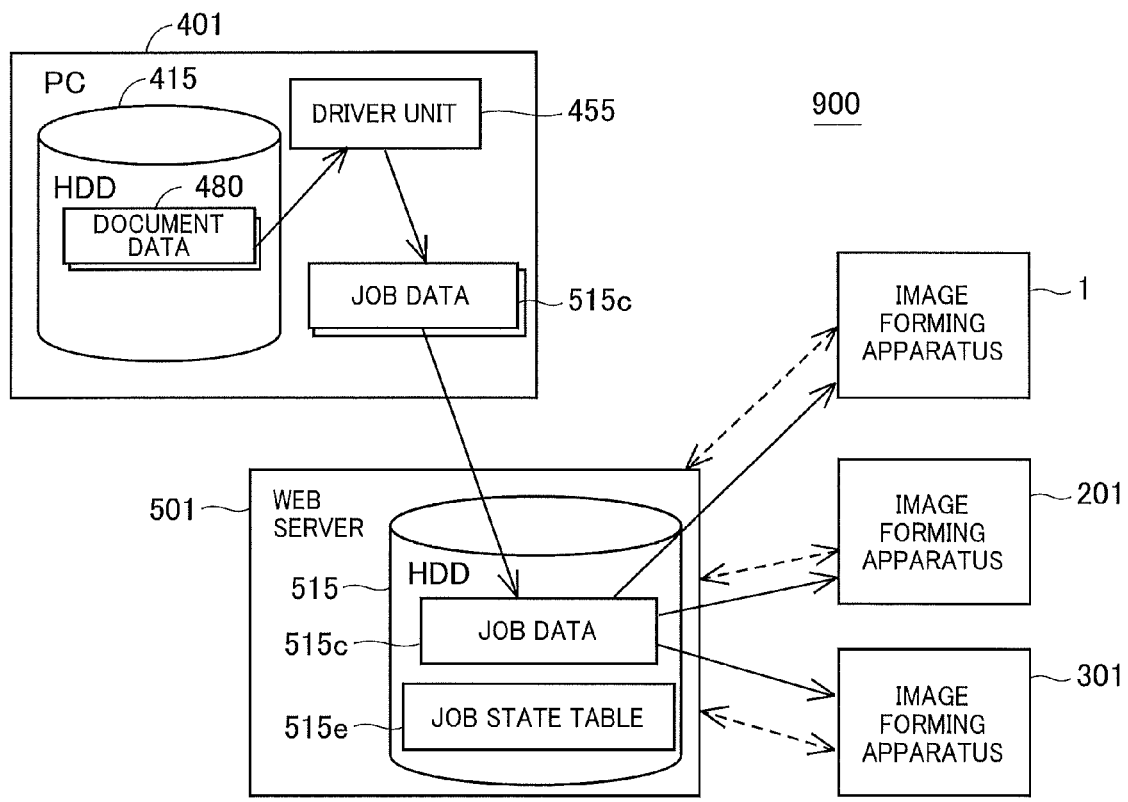
FIG. 5 is a block diagram illustrating an example of a pull-print function in the image forming system.

FIG. 5 is a block diagram illustrating an example of the pull-print function in image forming system 900.

Referring to FIG. 5, the pull print will be described in detail. The user transmits Web server 515c to Web server 501 from PC 401 before performing the pull print. For example, job data 515c is described in a PDL (Page Description Language) that can be dealt with by image forming apparatus 1. Image forming apparatus 1 interprets job data 515c as information on the print job. In image forming apparatus 1, a raster image is generated according to job data 515c by a RIP (Raster Image Processor) constructed by controller 20, and the print can be performed.

For example, job data 515c is generated and stored in Web server 501 as follows. PC 401 includes an HDD 415 and a driver unit 455 that is constructed such that a CPU (not illustrated) executes a control program. For example, the user operates an application program on PC 401, and inputs an instruction to transmit document data 480 stored in HDD 415 to Web server 501 to PC 401. In response to the instruction from the user, driver unit 455 converts document data 480 into job data 515c, and transmits job data 515c as the print job to Web server 501. That is, in performing the pull print, generated job data 515c is not directly transmitted to image forming apparatus 1, but tentatively spooled in Web server 501. Controller 520 of Web server 501 stores transmitted job data 515c in HDD 515. For example, a plurality of data storage partitions called BOX are provided in HDD 515. Job data 515c is stored in one of the BOXES. An access authority is set to each BOX in order to restrict the user who can access to the BOX. For example, when a specific user logs in to image forming apparatus 1, the access authority with respect to a certain BOX is set such that the user can access to the BOX from image forming apparatus 1 or store the data in the BOX.

When job data 515c is transmitted, Web server 501 updates a job state table 515e with respect to transmitted job data 515c. For example, job state table 515e includes information on a state in which each piece of job data 515c is performed.

When image forming apparatus 1 receives the instruction to perform the pull print while job data 515c is stored in HDD 515 of Web server 501, image forming apparatus 1 conducts communication with Web server 501 to acquire job data 515c. When acquiring job data 515c, image forming apparatus 1 performs the print job to output the printed matter. The instruction to perform the pull print may be received such that controller 20 of image forming apparatus 1 executes control program 23a for performing the pull print. The instruction to perform the pull print may be received by performing the Web application as described later.

For example, the pull print is performed while the user logs in to image forming apparatus 1 that is of an output destination of the pull print. In image forming apparatus 1 to which the user logs in, when the user performs the manipulation to perform the pull print, the printed matter is output while the user exists by the side of image forming apparatus 1. The pull print is performed in the above manner to obtain the high security effect. In the first embodiment, image forming apparatuses 201 and 301 have the same configuration and function as image forming apparatus 1, and image forming apparatuses 201 and 301 can perform the pull print. The user may select image forming apparatuses 1, 201, and 301 that perform the print when logging in to image forming apparatus 1. For example, the user may assign one of image forming apparatuses 1, 201, and 301 as a print destination when logging in to image forming apparatus 1.

[Description of Web Browser Function]

In the Web browser function of image forming apparatus 1, the Web page provided by Web server 501 is displayed on display panel 13 in a browsable manner by the Web browser (An example of the document acquisition unit, an example of the analysis unit, an example of the generator, and an example of the data acquisition unit). The Web browser accesses Web server 501 to acquire information on the Web page provided by Web server 501.

Figure 6:
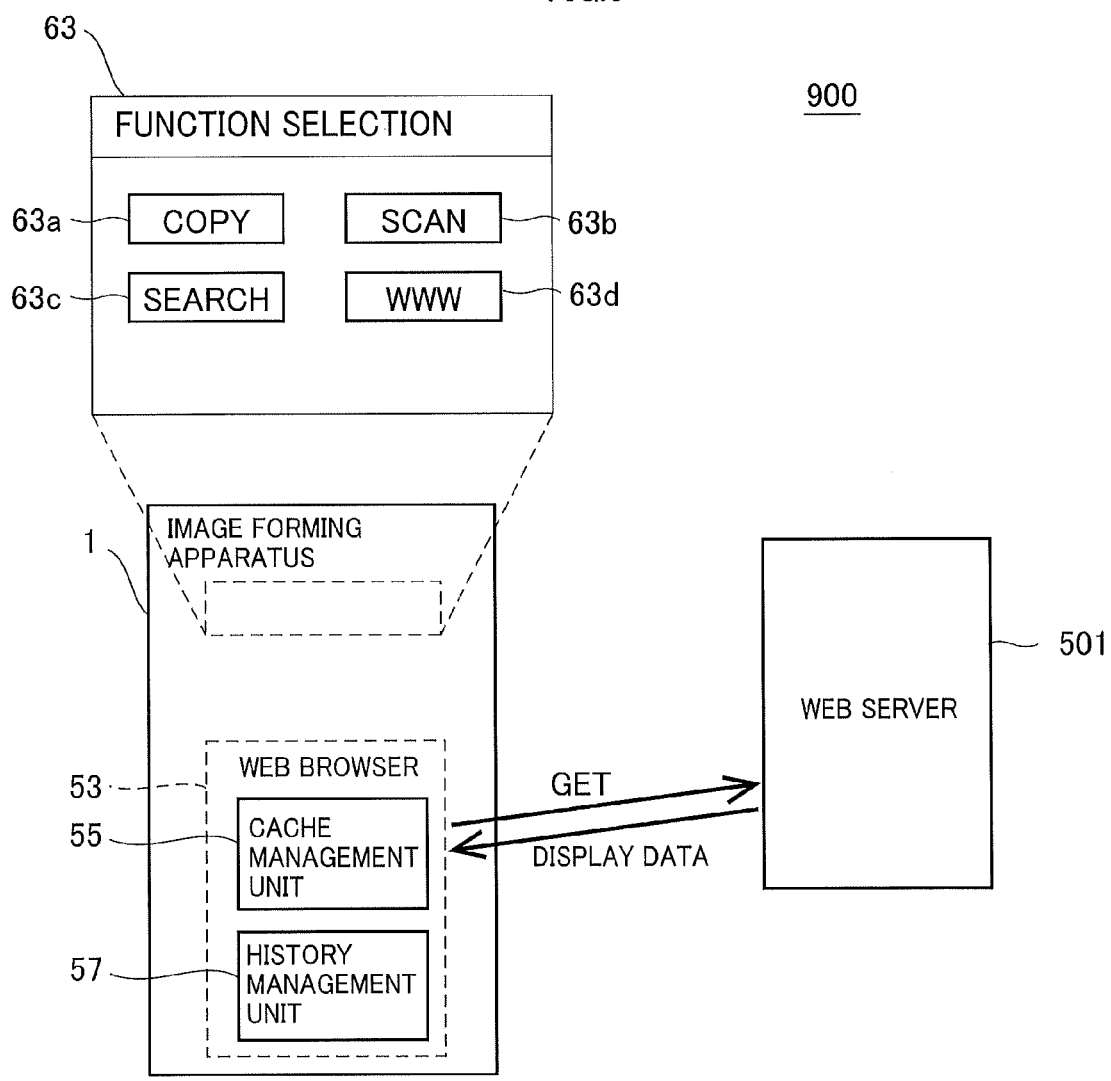
FIG. 6 is a view illustrating a Web browser function.

FIG. 6 is a view illustrating the Web browser function.

Referring to FIG. 6, in image forming apparatus 1, a Web browser 53 is activated and operated such that CPU 21 activates predetermined control program 23a. For example, Web browser 53 is activated when the user issues a predetermined manipulation instruction through manipulation unit 11 while a function selection screen 63 is displayed on display panel 13.

Function selection screen 63 is displayed on display panel 13 under the control of CPU 21. For example, buttons 63a, 63b, 63c, and 63d that are used to select various utilizable functions in image forming apparatus 1 are disposed in function selection screen 63. The functions corresponding to assigned buttons 63a, 63b, 63c, and 63d can be utilized by performing the manipulation to assign buttons 63a, 63b, 63c, and 63d through display panel 13 and the button of manipulation unit 11. Copy button 63a corresponds to a copying function. Scan button 63b corresponds to a scanner function. Search button 63c corresponds to a search function. Web button 63d corresponds to a Web browsing function. The search function is a function of connecting image forming apparatus 1 to a predetermined search engine to perform search work. The Web browsing function is a function in which the Web page provided by the desired Web server is displayed in the browsable manner or a function of printing the Web page. The search function and the Web browsing function can be used by utilizing the Web browser function. That is, when the manipulation to assign search button 63c or Web button 63d is performed, Web browser 53 is activated in image forming apparatus 1.

Web browser 53 generates the display image of the Web page and displays the generated display image of the Web page on display panel 13 based on information (for example, the data described in the HTML and the image data included in the Web page) for displaying the Web page.

In the Web browser function, image forming apparatus 1 can browse the Web page provided by the Web server that can conduct communication through network 800 including Web server 501. For example, Web browser 53 makes a request to acquire the information (display data) for displaying the Web page based on a URI assigned by the user by a predetermined communication protocol (such as the HTTP) (GET). The Web server that receives the request transmits the display data to Web browser 53. Therefore, Web browser 53 can acquire the display data. For example, the display data is page information 515a and image data 515b corresponding to page information 515a.

For example, the URI is assigned such that the user directly performs the input manipulation through manipulation unit 11. For example, the URI is assigned by performing the manipulation to assign a hyperlink that is included in the Web page displayed in the browsable manner and indicates another Web page.

A cache management unit 55 and a history management unit 57 function when Web browser 53 functions. Cache management unit 55 and history management unit 57 is implemented as one of the functions of Web browser 53. That is, cache management unit 55 and history management unit 57 are implemented such that CPU 21 executes control program 23a.

Cache management unit 55 stores the information acquired by Web browser 53 as cache information 15b in HDD 15. Cache information 15b includes page information described in the markup language and the image data included in the Web page that is browsed based on the page information. Cache information 15b may include the information and program used to display the Web page in addition to the page information and the image data. Cache management unit 55 manages each piece of cache information 15b using cache database 15a. In cache database 15a, for example, pieces of information such as the URI, a file name, and an acquisition time are stored with respect to the cache information.

History management unit 57 manages information on a history in which Web browser 53 acquires the information as the history information using history database 15c. For example, the history information includes the URI and acquisition time of the acquired information.

For example, cache management unit 55 deletes assigned cache information 15b and the information on cache information 15b stored in the cache database 15a in response to the manipulation instruction of the user. For example, history management unit 57 deletes the assigned record in the records of history database 15c in response to the manipulation instruction of the user.

Cache management unit 55 may delete one of or both cache information 15b and the information on cache information 15b stored in the cache database 15a in predetermined timing. Examples of the predetermined timing include the time a predetermined time elapses since cache information 15b is stored and the time a predetermined time elapses since the final access to the Web page. Similarly history management unit 57 may delete the record of history database 15c in predetermined timing. Examples of the predetermined timing include the time a predetermined time elapses since the history information is stored and the time a predetermined time elapses since the final access to the Web page.

According to the Web browser function, the user activates Web browser 53 to display the desired Web page on display panel 13, which allows the user to browse the Web page. The user can browse the Web page of the link destination of the hyperlink by assigning the hyperlink included in the browsing Web page. When the Web page is displayed by Web browser 53, the user can perform the predetermined manipulation instruction to Web browser 53. Therefore, the user can cause image forming apparatus 1 to form the image with respect to the currently-displayed Web page.

[Description of Web Application]

Web server 501 is configured to be able to provide the Web application. That is, Web server 501 acts as an application server (a Web application server). Web browser 53 accesses Web server 501 to acquire the information on the Web application, and displays the Web page. Therefore, Web browser 53 can present the Web application to the user such that the user can utilize the Web application. The following points can be cited as advantages of the Web application method. It is not necessary to individually set the application software in image forming apparatus 1 in the utilizable manner. Only when the program on the side of Web server 501 is changed, the Web application after the change can be utilized by the whole of image forming system 900. Accordingly, in image forming system 900, the convenience is enhanced and maintenance is easy to perform.

A specific example of the Web application function utilized in image forming system 900 will be described below. In image forming system 900, for example, the pull-print function and the scan transmission function are implemented by the Web application function. Hereinafter, sometimes the Web application that implements the pull-print function is referred to as "APP1". Sometimes the Web application that implements the scan transmission function is referred to as "APP2".

In the first embodiment, APP1 and APP2 can be utilized while being registered in image forming apparatus 1.

Figure 7:
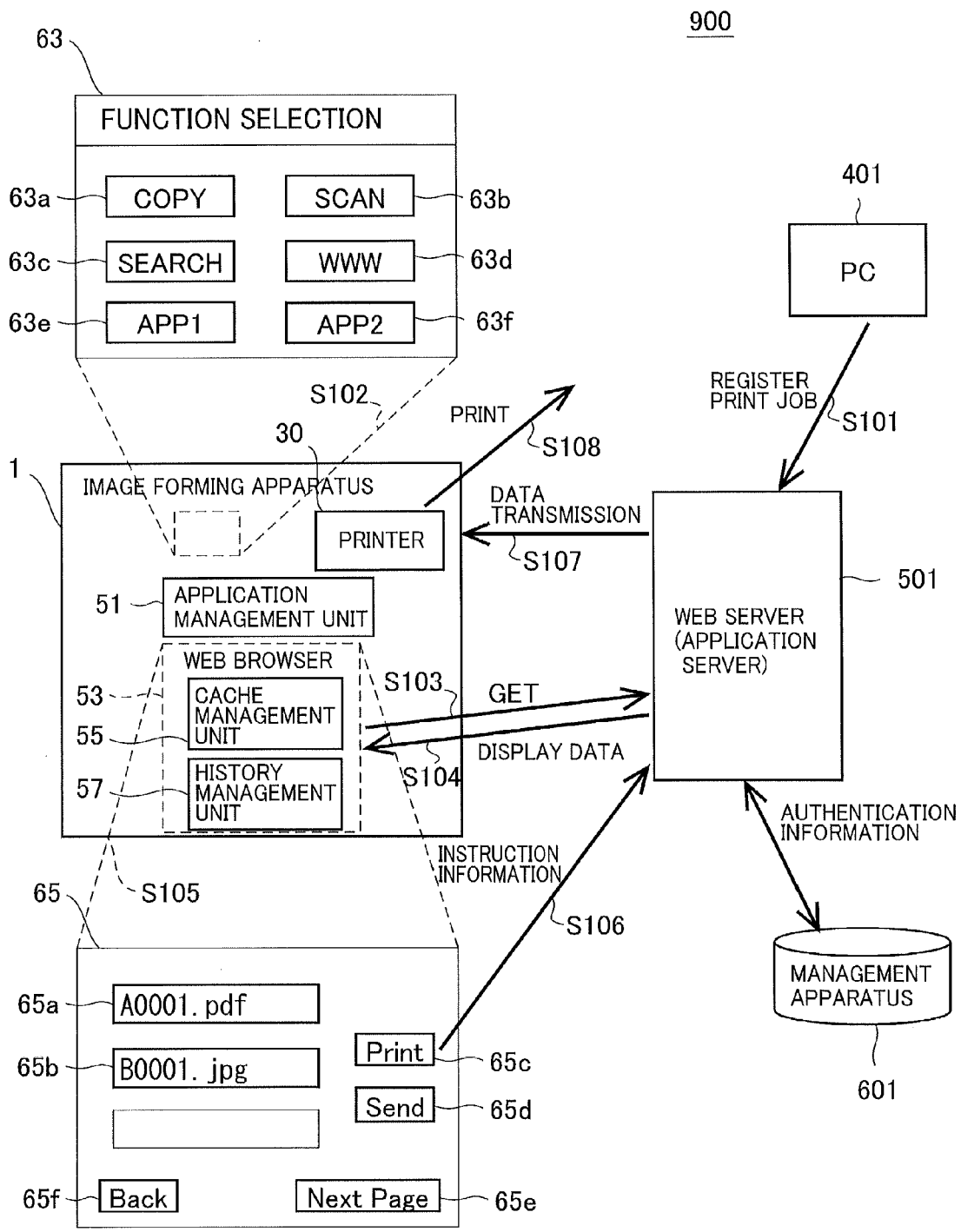
FIG. 7 is a view illustrating an example of the pull-print function implemented by a Web application function.

FIG. 7 is a view illustrating an example of the pull-print function implemented by the Web application function.

In the pull-print function, the print job is previously registered in Web server 501. In Step S101, PC 401 transmits the print job to Web server 501. When the print job is transmitted, job data 515c is stored in HDD 515 of Web server 501. The print job may be registered in a pull-print file server that is different from Web server 501.

In Step S102, when the Web application is utilized, manipulation unit 11 receives the instruction to select the Web applications registered by application management unit 51 as described later. That is, manipulation unit 11 receives the instruction to utilize the Web application.

In the first embodiment, while the Web applications are registered, buttons correlating to the Web applications are displayed on function selection screen 63. The buttons are displayed in parallel to buttons 63a, 63b, 63c, and 63d correlating to various stand-alone applications of image forming apparatus 1. In the example of FIG. 7, APP1 and APP2 are registered as the Web application in image forming apparatus 1. A button 63e that is used to activate APP1 and a button 63f that is used to activate APP2 are displayed on function selection screen 63 in conjunction with buttons 63a, 63b, 63c, and 63d. The user can utilize APP1 in image forming apparatus 1 by performing the manipulation input of button 63e. The user can utilize APP2 in image forming apparatus 1 by performing the manipulation input of button 63f.

Image forming apparatus 1 receives the instruction to perform the pull print from the user. That is, function selection screen 63 is displayed in display panel 13 of image forming apparatus 1. When the manipulation input of button 63e is performed on displayed function selection screen 63, APP1 corresponding to button 63e is activated. The Web page of APP1 is displayed by Web browser 53, and the user can browse the Web page and perform the manipulation input. Similarly, when the manipulation input of button 63f is performed on displayed function selection screen 63, APP2 corresponding to button 63f is activated. The Web page of APP2 is displayed by Web browser 53, and the user can browse the Web page and perform the manipulation input.

In Step S103, when the Web application is activated, Web browser 53 makes a request of the information on the Web page to Web server 501. At this point, cache information 15b is already stored with respect to the Web page on which the request of the information is made. When the Web page is not updated, Web browser 53 can acquire cache information 15b as contents of the Web page.

In Step S104, Web server 501 transmits the display data relating to the Web page at the request from Web browser 53. Therefore, Web browser 53 acquires the information for performing the Web application in response to the instruction to select the Web applications.

In Step S105, Web browser 53 performs the display on display panel 13 based acquired display data. Therefore, a print instruction screen (An example of the display screen of the Web application) 65 is displayed.

At this point, job selection buttons 65a and 65b, a print button 65c, a transmission button 65d, a transition-to-next-page button 65e, and a back button 65f are disposed on print instruction screen 65. Print instruction screen 65 has a screen configuration in which, at first glance, the user feels a stand-alone application manipulation screen. The user can select buttons 65a to 65f through manipulation unit 11. Buttons 65a to 65f are displayed in print instruction screen 65 such that the button images that are predetermined pieces of image data are displayed based on the page information.

The pieces of information on the print job stored in Web server 501 are displayed on job selection buttons 65a and 65b. The user can select the print job to be printed. Print button 65c is used to issue an instruction to perform the print job selected by one of buttons 65a and 65b. Transmission button 65d is used to issue an instruction to transmit the data of the print job selected by one of buttons 65a and 65b. For example, the data can be transmitted through the facsimile or the electronic mail. Transition-to-next-page button 65e is used to issue an instruction to display a page subsequent to the current page, for example, when the print jobs are displayed while being divided into a plurality of pages because of a large number of stored print jobs. Back button 65f is used to return to previously-displayed function selection screen 63 from print instruction screen 65.

In Step S106, when the user manipulates print button 65c, Web browser 53 transmits instruction information corresponding to the manipulation to Web server 501. The instruction information includes information specifying the print job of the print target and an instruction to print the print job. The instruction information may be information in a format for acquiring the URI or a format like another command.

In Step S107, when the instruction information is received, Web server 501 transmits the data of the specified print job to image forming apparatus 1.

In step S108, printer 30 of image forming apparatus 1 performs the print based on the data of the print job transmitted from Web server 501. That is, in image forming apparatus 1, the print job is performed in response to the instruction issued on print instruction screen 65.

Figure 8:
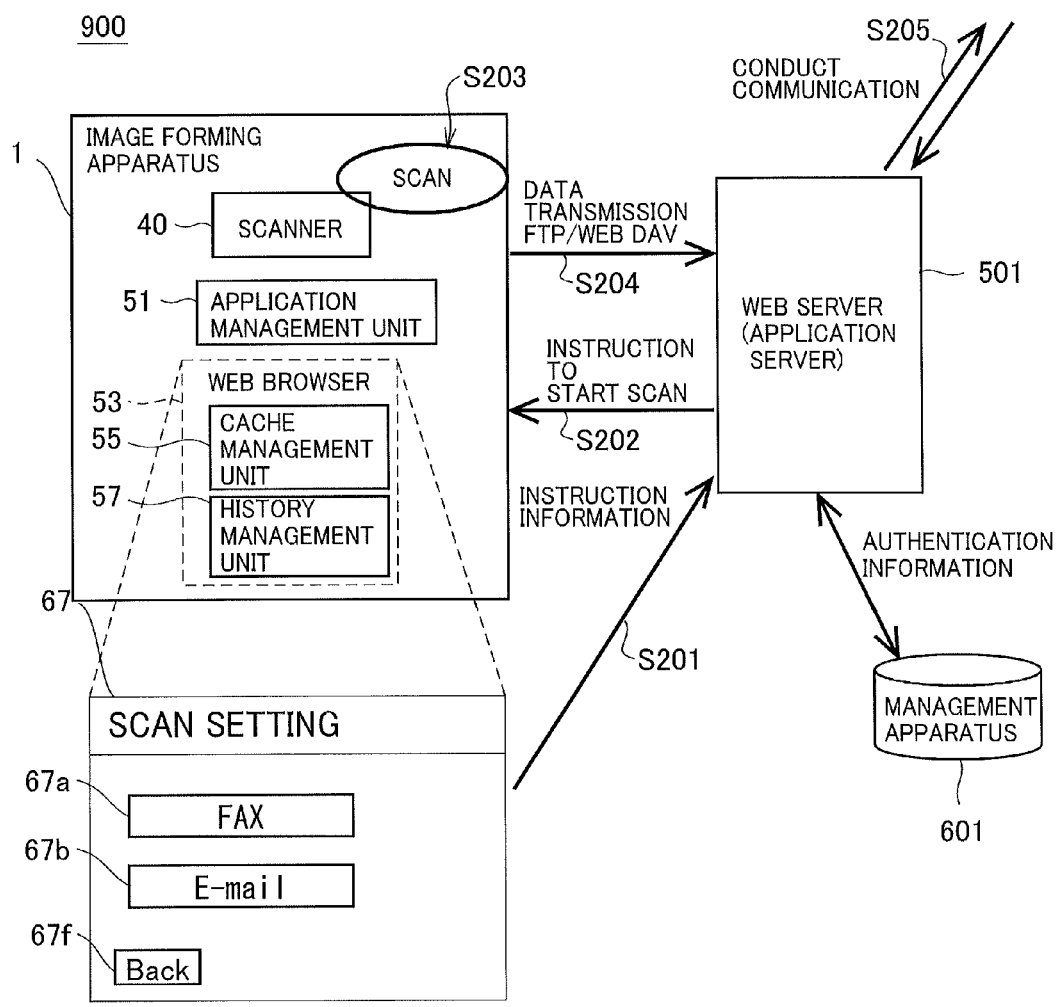
FIG. 8 is a view illustrating an example of a scan transmission function implemented by the Web application function.

FIG. 8 is a view illustrating an example of the scan transmission function implemented by the Web application function.

The scan transmission function is a function of transmitting the image data, which is generated by scanning the manuscript with scanner 40 of image forming apparatus 1, to the external device through Web server 501. Even if transmission destination information is not stored in image forming apparatus 1, the data can be transmitted based on the transmission destination information stored in Web server 501 or another apparatus in image forming system 900. For example, when the transmission destination information is stored in management apparatus 601 according to the user who logs in to image forming apparatus 1 or image forming system 900, the data may be transmitted to the transmission destination according to the login user.

For example, the scan transmission function is activated when button 63f corresponding to the scan transmission function is manipulated on the function selection screen 63. Web browser 53 accesses Web server 501 to acquire the information on the Web page. Based on the acquired information, Web browser 53 displays a setting screen of the scan transmission function such that the user can browse the scan transmission function setting screen. Therefore, the scan transmission function can be utilized.

Referring to FIG. 8, a setting screen (An example of the display screen of the Web application) 67 of the scan transmission function is displayed when the scan transmission function can be utilized. Setting screen 67 includes a facsimile transmission selection button 67a, an electronic mail transmission selection button 67b, and a back button 67f. Back button 67f is similar to back button 65f. Facsimile transmission selection button 67a is used to select facsimile transmission of the image that is generated by scanning the manuscript with scanner 40. When facsimile transmission selection button 67a is manipulated, the generated data is transmitted from Web server 501 by the facsimile transmission. Electronic mail transmission selection button 67b is used to select the transmission of the image, which is generated by scanning the manuscript with scanner 40, by the electronic mail. When electronic mail transmission selection button 67b is manipulated, the generated data is transmitted from Web server 501 by the electronic mail. Buttons 67a, 67b, and 67f are displayed in setting screen 67 such that the button images that are predetermined pieces of image data are displayed based on the page information.

When facsimile transmission selection button 67a or electronic mail transmission selection button 67b is manipulated, setting screen 67 transitions to a transmission destination selection screen (not illustrated) for setting the transmission destination. For example, transmission destination candidates to which the image data can be transmitted by the scan transmission function is displayed on the transmission destination selection screen, and the user selects the actual transmission destination of the image data from the transmission destination candidates. The transmission destination candidates may be displayed based on the information stored in Web server 501 or the transmission destination information stored in management apparatus 601. The transmission destination candidates may be displayed based on the information stored in image forming apparatus 1.

In Step S201, when the manipulation to select the transmission method (for example, the facsimile transmission or the transmission by the electronic mail) is performed in setting screen 67, Web browser 53 transmits the instruction information to Web server 501. The instruction information may be information in the format for acquiring the URI or the format like another command.

In Step S202, Web server 501 transmits an instruction to start the scan to image forming apparatus 1 that transmits the instruction information.

In Step S203, image forming apparatus 1 scans the manuscript in response to the instruction to start the scan. Scanner 40 performs the scan. Therefore, the image data is generated.

In Step S204, image forming apparatus 1 transmits the generated image data to Web server 501. The transmission is performed by the protocol such as FTP (File Transfer Protocol) and WebDAV (Web Distributed Authoring and Versioning). The image data is stored in Web server 501.

In Step S205, based on the instruction information, Web server 501 transmits the image data to the assigned transmission destination by the method assigned on setting screen 67. For example, when the instruction to perform the facsimile transmission is issued, Web server 501 transmits the image data to an assigned telephone number as the transmission destination through a telephone line. When the instruction to perform the transmission by the electronic mail is issued, Web server 501 transmits the image data to an assigned mail address as the transmission destination by the electronic mail based on MIME (Multipurpose Internet Mail Extension). In performing the facsimile transmission, the image data may be transmitted through an IP (Internet Protocol) network such as Internet FAX.

In image forming apparatus 1, after image processing is performed to the image data generated by scanner 40, and the processed image data may be transmitted to Web server 501. After the image processing is performed to the transmitted image data, Web server 501 may transmit the image data. In this case, the image processing assigned on setting screen 67 may be performed. When the image processing is performed in image forming apparatus 1, information for specifying the image processing that should be performed to the image data may be transmitted from Web server 501 to image forming apparatus 1 once the instruction to start the scan is issued. In this case, for example, the information on the transmission method is transmitted to image forming apparatus 1, and image forming apparatus 1 may perform the image processing according to the transmission method.

The instruction information includes information for assigning the image forming apparatus that performs the scan, and Web server 501 may transmit the instruction to start the scan to the image forming apparatus that is assigned by the instruction information. In this case, the image forming apparatus to which the instruction to start the scan is transmitted may scan the manuscript and transmit the generated image data to Web server 501.

In the first embodiment, the image data is transmitted from Web server 501. Alternatively, the image data may be transmitted from another apparatus. For example, the image data may be transmitted from image forming apparatus 1. In this case, Web server 501 transmits an instruction to transmit the information on the selected transmission destination and the information on the selected transmission method to image forming apparatus 1, and image forming apparatus 1 may transmit the image data based on the instruction. Image forming apparatus 1 transmits the image data to another transmission server, the transmission server receives the instructions of the transmission method and transmission destination from Web server 501, and the transmission server may transmit the image data.

In the first embodiment, for example, certification information is provided to the Web application satisfying a given requirement. That is, in image forming apparatus 1, the Web application to which the certification information is provided, namely the certified Web application and the uncertified Web application can be utilized. Image forming apparatus 1 can change a handling method relating to the registration of the Web application based on whether the Web application is certified.

[Description of Registration of Web Application]

In the first embodiment, one or a plurality of Web applications can be registered in image forming apparatus 1. The registration of the Web application means that the Web application is set in image forming apparatus 1 so as to be able to be quickly activated. In the first embodiment, for example, information (such as the URI) for acquiring information (for example, information on the Web page displayed in activating the Web application) for performing the Web application is registered. When the Web application is registered, a shortcut icon that activates the Web application is displayed on the predetermined function selection screen such that the user can easily select the shortcut icon. At this point, information necessary to register the Web application and information necessary to use the registered Web application are transmitted from Web server 501 to image forming apparatus 1. The transmitted pieces of information are stored in image forming apparatus 1. Web browser 53 acquires the information for performing the Web application based on the information, such as the URI, which is registered in an application management unit 51 to acquire the information on the Web page. The user can easily utilize the Web application by the registration of the Web application. For example, the registration of the Web application is performed by recording the URI of the application to be registered in a database that manages the Web application.

The Web application may be registered in the following mode. For example, the Web application may be registered by recording what is called a bookmark (the URL of the Web page is recorded in Web browser 53 so as to be able to be selected again) including the information, such as the URI, which activates the Web application. For example, even if the shortcut icon is not displayed, the bookmark is set in image forming apparatus 1 such that the Web application is activated according to the predetermined manipulation input performed by the user or a predetermined behavior (such as the authentication operation), which can be detected by image forming apparatus 1, performed by the user.

Only the user who logs in to image forming apparatus 1 by the user authentication function may register the Web application. For example, the registration of the Web application can be restricted such that only the user who has manager authority of image forming apparatus 1 or the user who has manager authority of image forming system 900 resisters the Web application.

The registerable Web application may be restrictive. Application management unit 51 may be set such that only a predetermined Web application can be registered. In this case, when the Web application is assigned as the registration target, application management unit 51 may determine whether the Web application is registerable. For example, application management unit 51 previously may have a table indicating the registerable Web application. In this case, application management unit 51 may determine that the Web application is registerable based on the table.

Only the Web application to which the certification information is provided may be registered. Application management unit 51 acquires the approval information on the Web application from Web server 501 prior to registering the Web application, and application management unit 51 may determine whether the Web application is registerable based on the approval information. For example, application management unit 51 may make the above determination by referring to certification table 15e stored in HDD 15. For example, the pieces of information on the certified Web applications are summarized in certification table 15e.

The Web application may be registered in image forming apparatus 1 based on an instruction from an external device that can conduct communication with Web server 501 or image forming apparatus 1. For example, Web server 501 transmits the information on the Web application to image forming apparatus 1 of the registration target, and application management unit 51 of image forming apparatus 1 may register the Web application when the information is received.

[Description of Data Acquisition Operation During Utilization of Web Application]

In the first embodiment, the following operation is performed when the Web application is utilized as described above. Web browser 53 acquires page information 515a on the Web application and performs analysis processing to acquired page information 515a. In the analysis processing, whether a previously-set fixed name is included is made with respect to the URI indicating the image in the URIs (including a path) included in page information 515a. When the fixed name is included in the URI, Web browser 53 acquires the image data correlating to the URI from a predetermined location that is previously correlated to the fixed name. Using the acquired image data, Web browser 53 generates the display screen of the Web application based on page information 515a. The generated display screen is displayed on display panel 13, which allows the user to use the Web application.

The fixed name is one that is previously set to image forming apparatus 1. The fixed name is correlated to the predetermined location in which the image data is stored. A correspondence relationship between the fixed name and the predetermined location is set as analysis table 15f.

A common image (an example of the common data) that is identical to the image displayed during the operation of the built-in application of image forming apparatuses 1, 201, and 301 can be cited as an example of the image data that is stored in the predetermined location correlated to the fixed name. The common image is an image, such as a manipulation icon, which is displayed by the built-in application. In the first embodiment, using the common image, the display screen of the Web application is generated according to page information 515a. Therefore, the uniformity of the UI of the Web application and the UI of the built-in application is enhanced. Accordingly, the user is hardly confused in utilizing the Web application.

When the Web application is being registered, image forming apparatus 1 acquires at least part of the image data, which is used in the Web application although not stored in image forming apparatus 1. The acquired image data is stored in image forming apparatus 1. In utilizing the Web application, Web browser 53 acquires the image data stored in image forming apparatus 1. Web browser 53 generates the display screen of the Web application using the acquired image data. Therefore, in utilizing the registered Web application, the image data stored in image forming apparatus 1 can be used with respect to the image data specific to the vender (image data specific to the Web application).

Figure 9:
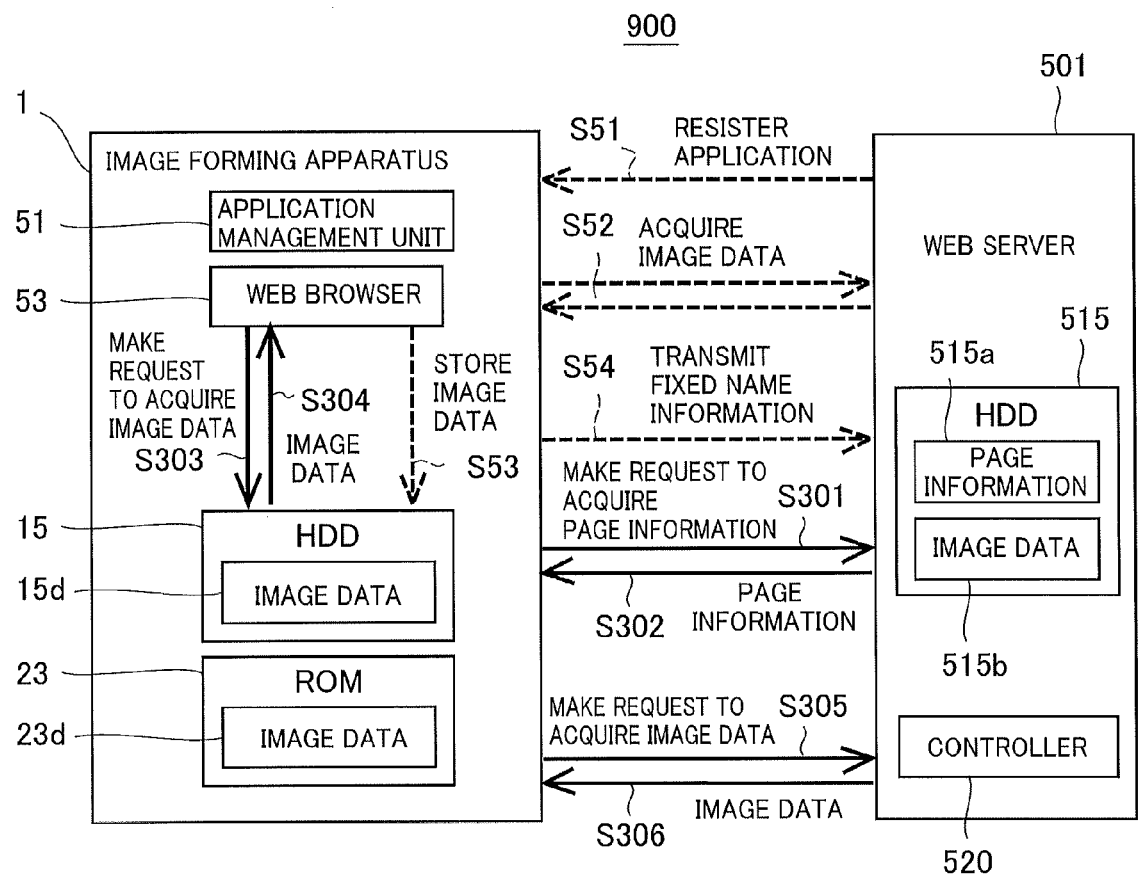
FIG. 9 is a view illustrating an operation during registration and utilization of a Web application in the image forming system.

FIG. 9 is a view illustrating an operation during registration and utilization of the Web application in image forming system 900.

A flow of the registration of the Web application will be described. Referring to FIG. 9, application management unit (an example of the registration unit, an example of the second storage, an example of the determination unit, and an example of the name setting unit) 51 is provided in image forming apparatus 1. Application management unit 51 is implemented such that CPU 21 executes control program 23a.

Application management unit 51 registers the Web application provided by Web server 501. For example, when the manipulation input is performed in image forming apparatus 1, application management unit 51 registers the Web application in image forming apparatus 1.

In Step S51, in image forming apparatus 1, when the Web application provided by Web server 501 is assigned as the Web application that becomes a registration target, application management unit 51 acquires the information on the Web application assigned from Web server 501. Application management unit 51 acquires the information, such as the URI and identification information (such as a cookie) of the Web application, which is necessary to use the Web application. At this point, application management unit 51 may store the information on the Web page, in which the Web application is displayed, in cache management unit 55. Application management unit 51 registers the Web application based on the acquired information.

At this point, application management unit 51 determines whether the registered Web application that is provided by the server is certified. Application management unit 51 determines whether the registered Web application is certified by referring to certification table 15e stored in HDD 15. When the Web application is uncertified, application management unit 51 does not perform the following pieces of processing. That is, when the Web application is uncertified, image data 515b is not acquired from Web server 501 described later.

In Step S52, when the Web application is certified, application management unit 51 acquires image data 515b of the Web application from Web server 501 to perform the following pieces of processing (Steps S53 and S54). At this point, the image data that is not stored in image forming apparatus 1 is acquired from Web server 501.

In Step S53, application management unit 51 stores the image data, which is acquired from Web server 501, as image data 15d in HDD 15. In the first embodiment, image data 15d is stored independently of cache information 15b, which is stored in HDD 15 by a usual function of Web browser 53. In HDD 15, image data 15d is stored in a predetermined directory. The image data acquired from Web server 501 may be stored in not HDD 15, but ROM 23 as image data 23d.

In Step S54, application management unit 51 transmits the fixed name to Web server 501. The fixed name relates to the Web application that is registered by the registration unit. Application management unit 51 sets the fixed name while correlating the fixed name to the predetermined directory that is the storage location of image data 15d. When performing the setting of fixed name, application management unit 51 transmits information on the set fixed name to Web server 501. The storage location of image data 15d is not limited to the predetermined directory, but application management unit 51 may properly determine the storage location of image data 15d.

When receiving the information on the fixed name, Web server 501 performs processing of checking page information 515a based on the information on the fixed name. That is, controller 520 acquires the information on the fixed name transmitted from image forming apparatus 1. Based on the acquired information, controller 520 changes page information 515a on the Web page of the Web application as needed basis. In the URIs included in page information 515a, controller 520 changes the URI relating to image data 15d stored in HDD 15 such that the fixed name set by the application management unit 51 is included in the URI relating to image data 15d. Therefore, during the use of the Web application, image data 15d can be used in image forming apparatus 1. When the URI included in page information 515a already includes the fixed name, page information 515a is not changed.

Alternatively, for example, application management unit 51 may set the fixed name based on an instruction from Web server 501. In this case, it is not necessary that image forming apparatus 1 transmit the information on the fixed name to Web server 501. In registering the Web application, controller 520 of Web server 501 transmits the instruction information on the fixed name, which should be set, to image forming apparatus 1 based on the URI relating to image data 15d in the URIs included in page information 515a. That is, controller 520 generates the instruction information such that the fixed name set by image forming apparatus 1 is included in the URI relating to image data 15d. Controller 520 transmits the instruction information to image forming apparatus 1. Application management unit 51 receives the instruction information and sets the fixed name based on the instruction information.

An operation during the utilization of the registered Web application will be described below.

For example, an instruction to utilize the Web application is received from the user. In Step S301, in response to the instruction, Web browser 53 makes a request to Web server 501 to acquire page information 515a on the Web application.

In Step S302, Web server 501 receives the acquisition request to transmit page information 515a to image forming apparatus 1. Web browser 53 acquires page information 515a.

Web browser 53 analyzes the URI indicating the image in the URIs included in acquired page information 515a, and determines whether the previously-set fixed name is included in the URI. For example, Web browser 53 sets the URI included in an IMG tag to analysis target as the URI indicating the image. The analysis is performed by referring to analysis table 15f. With respect to each URI, the acquired image data is changed according to the analysis result.

In Steps S303 and S304, when determining that the fixed name is included in the URI, Web browser 53 specifies the predetermined location correlated to the fixed name by referring to analysis table 15f. Web browser 53 acquires the image correlating to the URI from the specified predetermined location. In the first embodiment, the predetermined directory in HDD 15 or the predetermined directory in ROM 23 is correlated to the fixed name set to the image forming apparatus. That is, when the fixed name is included in the URI, Web browser 53 acquires image data 15d or 23d correlating to the URI from HDD 15 or ROM 23.

As described above, application management unit 51 acquires the image data in registering the Web application. When the Web application is used, Web browser 53 analyzes whether the fixed name set in registering the application is included in the URI. When the fixed name is included in the URI, Web browser 53 acquires image data 15d correlating to the URI from the predetermined directory correlated to the fixed name in HDD 15.

In Steps S305 and S306, Web browser 53 acquires the data correlating to the URI with respect to the URI that does not include the fixed name in the URIs included in acquired page information 515a. For example, Web browser 53 accesses Web server 501 to acquire image data 515b. As to the uncertified Web application, the data indicated by the URI is acquired when the image data is not acquired during the registration.

Using the pieces of data, such as the image data, which are acquired in Steps S304 and S306, Web browser 53 generates the display screen of the Web application based on page information 515a.

Web browser 53 preferentially uses the data, which is acquired as the data correlating to the URI including the fixed name, rather than cache information 15b. It is assumed that the image data correlating to the URI is temporarily stored as cache information 15b in image forming apparatus 1, and that the URI includes the fixed name. In this case, when image data 15d or 23d is acquired from the location correlating to the fixed name, Web browser 53 generates the display screen with no use of cache information 15b. At this point, Web browser 53 generates the display screen using acquired image data 15d or 23d. Therefore, the display screen is generated using the high-reliability data acquired from the predetermined location.

It is assumed that the setting is performed such that cache information 15b temporarily stored in image forming apparatus 1 is not used, for example, it is assumed that the cache function of the browser is invalidated. Even in this case, Web browser 53 generates the display screen using image data 15d or 23d, which is acquired as the image data correlating to the URI including the fixed name and stored in image forming apparatus 1. Therefore, the display screen in which the data correlating to the UM including the fixed name is securely displayed irrespective of the utilization of the cache function.

Figures 10, 11:
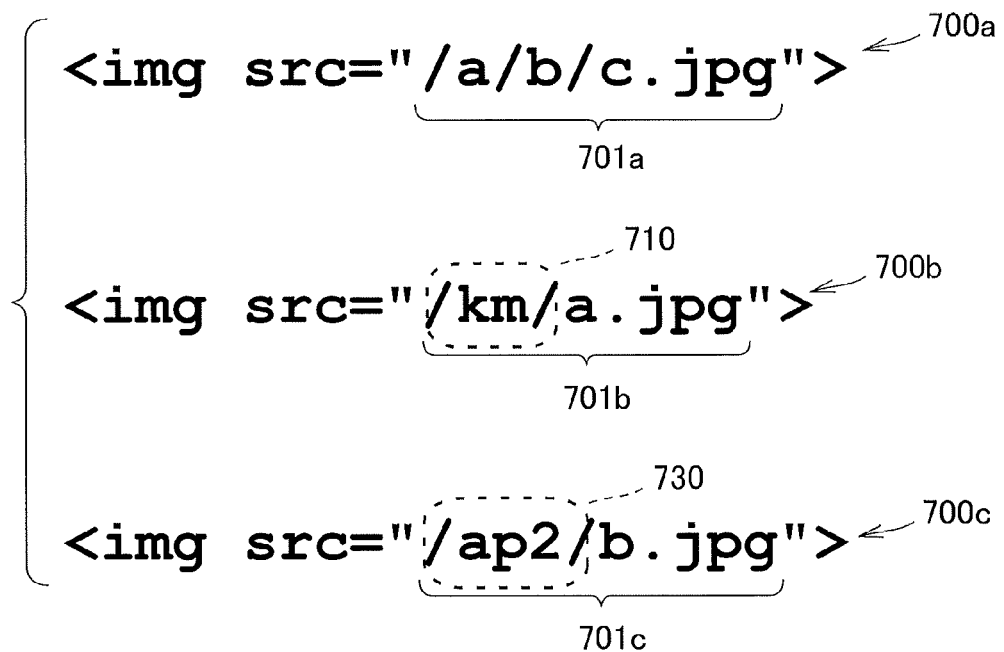
FIG. 10 is a view illustrating an example of contents of an analysis table.
FIG. 11 is a view illustrating a URI included in page information.

FIG. 10 is a view illustrating an example of contents of analysis table 15f.

Referring to FIG. 10, in analysis table 15f, the fixed name is correlated to the location of the corresponding image data. For example, the fixed name includes "/km/", "/ap1/", and "/ap2/".

"/rom/panel/img/km/" that is the directory of ROM 23 is correlated as the predetermined location for the fixed name "/km/". The common image is stored as image data 23d in the directory. The fixed name "/km/" is set with respect to a common image. As used herein, the common image means an image that may be shared with other applications. The common image is utilized in the built-in application of image forming apparatus 1 or a given Web application (for example, the certified Web application). Examples of the common image include a background image, a button image, and an icon image of the Web page of the Web application. Only some of these images may be stored as the common image.

"/hdd/app/ap1/" that is the directory of HDD 15 is correlated as the predetermined location to the fixed name "/ap1/". The images, which are acquired by application management unit 51 in registering Web application APP1, are stored as image data 15*d* in the directory. "/hdd/app/ap2/" that is the directory of HDD 15 is correlated as the predetermined location to the fixed name "/ap2/". The images, which are acquired by application management unit 51 in registering Web application APP2, are stored as image data 15*d* in the directory.

FIG. 11 is a view illustrating the URI included in page information 515*a*.

FIG. 11 illustrates three IMG tags (partially illustrated, hereinafter sometimes simply referred to as a tag) 700*a*, 700*b*, and 700*c* that are included in page information 515*a* described in HTML format. Each of tags 700*a*, 700*b*, and 700*c* is described in the form of "<img src=" ">". That is, each of tags 700*a*, 700*b*, and 700*c* indicates the image (included in the Web page) displayed in the Web page expressed by page information 515*a*. In tags 700*a*, 700*b*, and 700*c*, portions surrounded by double quotation marks include URIs 701*a*, 701*b*, and 701*c* indicating the images, respectively. In the first embodiment, Web browser 53 analyzes URIs 701*a*, 701*b*, and 701*c* assigned by IMG tags 700*a*, 700*b*, and 700*c* as the URI indicating the image in the URIs included in page information 515*a*. URIs 701*a*, 701*b*, and 701*c* are what is called a relative URI (relative path).

It is assumed that "/km/", "/ap1/", and "/ap2/" are assigned as the fixed names in analysis table 15*f* of image forming apparatus 1 as described above. In this case, Web browser 53 determines whether URIs 701*a*, 701*b*, and 701*e* of tags 700*a*, 700*b*, and 700*c* include the fixed names, respectively.

URI 701*a* of tag 700*a* is "/a/b/c.jpg". URI 701*a* does not include the fixed name. Therefore, for tag 700*a*, Web browser 53 acquires "/a/b/c.jpg" that is the image data according to URI 701*a*.

URI 701*b* of tag 700*b* is "/km/a.jpg". URI 701*b* includes the fixed name "/km/" (fixed name 710) that is surrounded by a broken line in FIG. 11. Therefore, for tag 700*b*, Web browser 53 acquires "a.jpg" that is the image data from "/rom/panel/img/km/" that is the directory correlated to fixed name 710 in ROM 23 according to URI 701*b* except fixed name 710. In this case, the whole data "/km/a.jpg" indicated by URI 701*b* is not acquired.

URI 701*c* of tag 700*c* is "/ap2/b.jpg". URI 701*c* includes the fixed name "/ap2/" (fixed name 730) that is surrounded by a broken line in FIG. 11. Therefore, for tag 700*c*, Web browser 53 acquires "b.jpg" that is the image data from "/hdd/app/ap2/" that is the directory correlated to fixed name 730 in HDD 15 according to URI 701*c*. In this case, the whole data "/ap2/b.jpg" indicated by URI 701*c* is not acquired.

Figure 12:
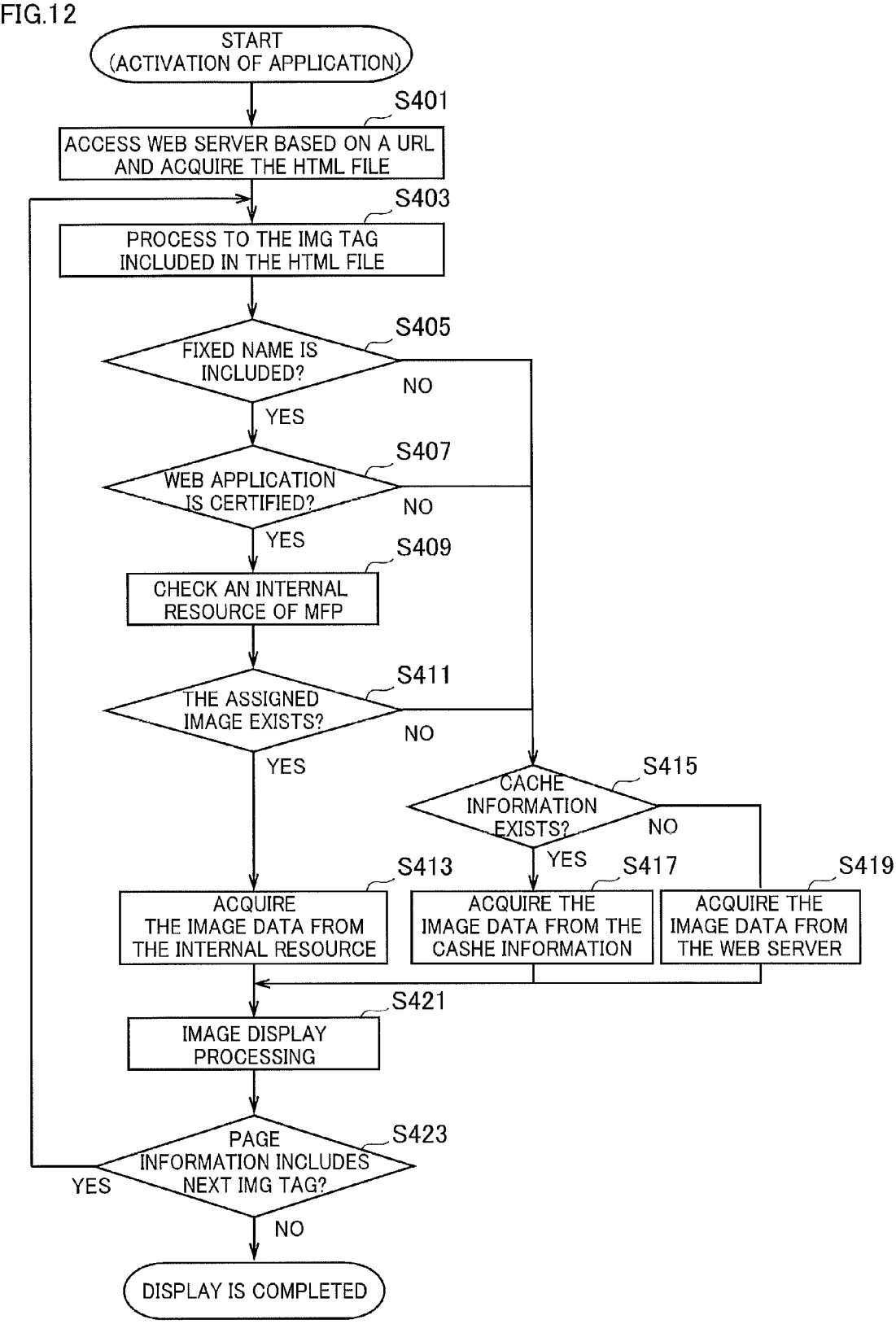
FIG. 12 is a flowchart illustrating an operation when activation of the Web application is started in the image forming apparatus.

FIG. 12 is a flowchart illustrating the operation when activation of the Web application is started in image forming apparatus 1.

For example, when the user issues an instruction to activate the Web application, CPU 21 of image forming apparatus 1 controls Web browser 53 to start the activation of the Web application.

Referring to FIG. 12, in Step S401, CPU 21 accesses Web server 501 based on a URL (an example of the URI) of the Web application to be activated. CPU 21 acquires an HTML file (page information 515*a*) from Web server 501.

In Step S403, CPU 21 performs processing (analysis) to the IMG tag included in the acquired HTML file.

In Step S405, CPU 21 determines whether the fixed name is included in the URI assigned by the IMG tag. In other words, CPU 21 determines whether page information 515*a* includes the URI of the fixed name image.

When the fixed name image is included in Step S405, CPU 21 determines whether the Web application is certified (certified application) in Step S407. For example, the determination is made by referring to certification table 15*e*.

When the Web application is the certified application in Step S407, CPU 21 checks an internal resource of image forming apparatus (MFP) 1 in Step S409. As used herein, the internal resource means, for example, the data stored in ROM 23 or HDD 15. CPU 21 checks the internal resource in the location correlating to the fixed name included in the URI. CPU 21 checks whether the data (assigned image) correlating to the URI, namely, the fixed name image exists as the internal resource.

In Step S411, CPU 21 determines whether the assigned image correlating to the URI exists as the internal resource.

When the assigned image exists in Step S411, CPU 21 acquires the image data of the assigned image from the internal resource in Step S413. In other words, CPU 21 acquires the image data from the predetermined location correlating to the fixed name according to the URI.

On the other hand, when the fixed name image is not included in Step S405, when the certified application does not exist in Step S407, or when the assigned image does not exist in Step S411, the image is acquired from cache information 15*b* or Web server 501 for the URI. That is, when the fixed name is not included in the URI, or when the Web application is not the certified application, the data indicated by the URI is acquired. In Step S415, CPU 21 checks whether recorded cache information 15*b* exists. CPU 21 determines whether cache information 15*b* correlating to the URI included in page information 515*a* exists. For example, the determination is made by referring to cache database 15*a*.

When cache information 15*b* exists in Step S415, CPU 21 acquires the image data correlating to the URI from cache information 15*b* in Step S417. Therefore, traffic of network 800 can be reduced while the image data is quickly acquired.

When cache information 15*b* does not exist in Step S415, for example, CPU 21 acquires the image data correlating to the URI from Web server 501 in Step S419.

A source of the data acquisition is not limited to Web server 501, but another server assigned by the URI may be used.

When the image data is acquired in Step S413, Step S417, or Step S419, CPU 21 performs image display processing in Step S421. Using the acquired image data, CPU 21 generates the portion of the image data in the display screen of the Web application according to page information 515*a*. CPU 21 displays the generated display screen on display panel 13.

In Step S423, CPU 21 determines whether page information 515*a* includes another IMG tag (next IMG tag). When the IMG tag is included, the pieces of processing in Steps S403 to S421 are repeatedly performed until the pieces of processing are completed for all the IMG tags. Therefore, in Step S421, Web page including the images assigned by all the IMG tags is displayed on display panel 13. When the pieces of processing are completed for all the IMG tags, and when another IMG tag is not included in Step S423, the display of the Web page is completed. That is, the processing during the activation of the Web application is completed.

[Description of Display Screen Example]

Figure 13:
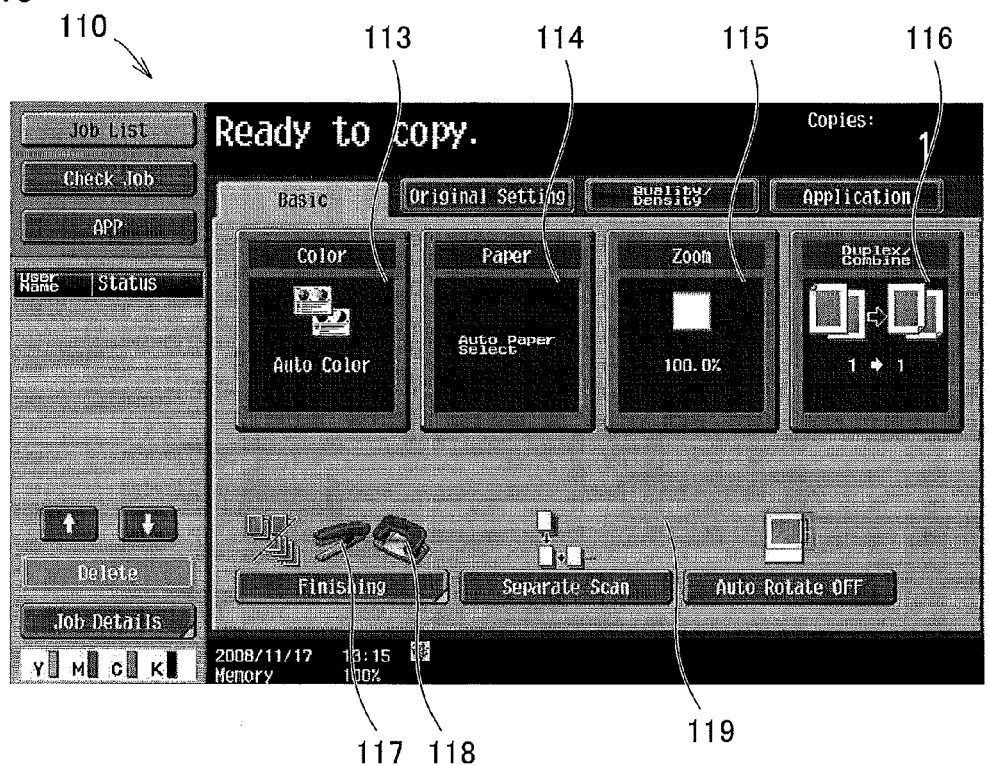
FIG. 13 is a view illustrating an example of a display screen of a built-in application in the image forming apparatus.

FIG. 13 is a view illustrating an example of the display screen of the built-in application in image forming apparatus 1.

Referring to FIG. 13, when the built-in application of image forming apparatus 1 is activated, display screen 110 is displayed on display panel 13. For example, display screen 110 is in a copy mode (duplicate mode) and is a UI image displayed in a state in which a copy starting instruction can be received. Display screen 110 is configured such that plural kinds of button images 113, 114, 115, and 116 and icon images 117 and 118 are disposed on background image 119.

Button image 113 is manipulated to receive a setting instruction indicating whether the read image is formed in black and white or color. Button image 114 is manipulated to receive a setting relating to a sheet in which the image is formed. Button image 115 is manipulated to receive a setting relating to a scaling factor of the formed image to the read image. Button image 116 is manipulated to receive a setting relating to a function of forming plural images and a combine print function.

Icon image 117 corresponds to a stapling function in forming the plurality of images. Icon image 118 corresponds to a punching function in making a hole in the sheet in which the image is formed. An image, in which the user easily distinguishes button images 113, 114, 115, and 116 and icon images 117 and 118 from one another when the image is used as the background, is used as background image 119.

In the first embodiment, button images 113, 114, 115, and 116, icon images 117 and 118, and background image 119 are stored as image data 23d in ROM 23. These images are the common image that can be utilized on the display screen of the certified Web application. In the images, when the predetermined fixed name is included in the URI, the image correlating to the URI is utilized on the display screen of the Web application.

Figure 14:
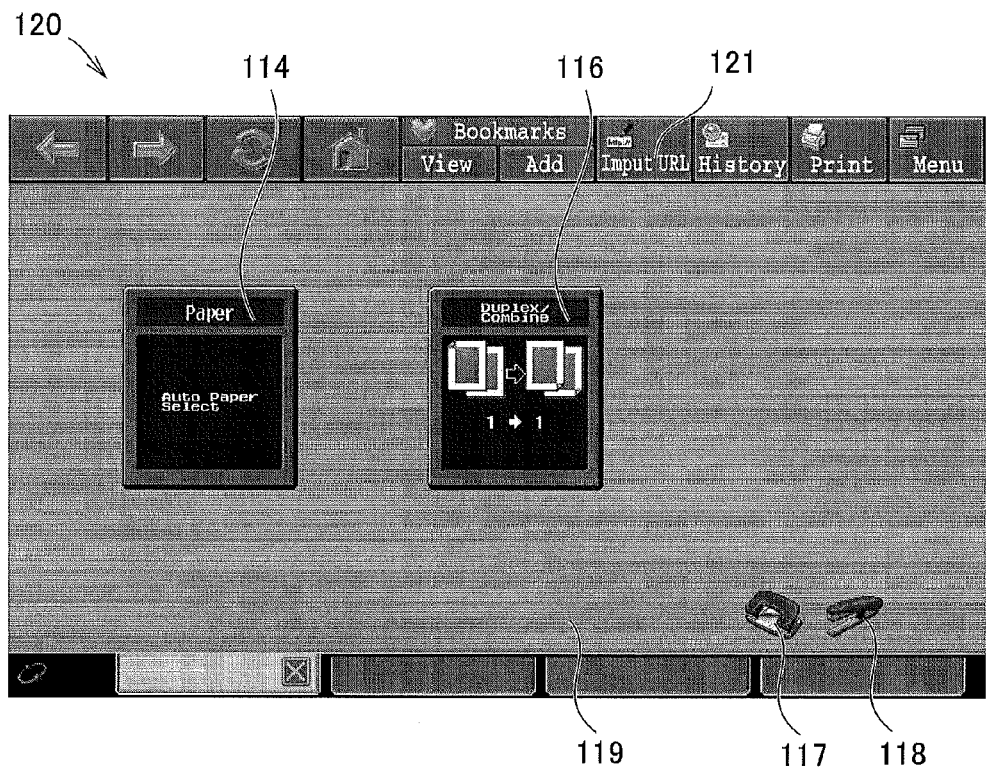
FIG. 14 is a view illustrating an example of a display screen of the certified Web application activated in the image forming apparatus.

FIG. 14 is a view illustrating an example of the display screen of the certified Web application activated in image forming apparatus 1.

Referring to FIG. 14, display screen 120 of the Web application is displayed based on the description of page information 515a. Display screen 120 is displayed by Web browser 53. Display screen 120 is divided into menu bar image 121 of Web browser 53 and a remaining display region of the Web page. The display region of the Web page is configured such that button images 114 and 116 and icon images 117 and 118 are displayed on background image 119.

The URI in which the correlating fixed name is stored in ROM 23 is included in page information 515a expressing the Web page of the Web application of the first embodiment such that the common image is used. Therefore, the UI in which the same image as the built-in application of image forming apparatus 1 is used can be displayed as the UI of the Web application.

For example, in a process of producing the Web application, page information 515a may be described as follow. In the case that the same background image and button image as those of image forming apparatus 1 are used as the UI of the Web application, the URI (such as the path and the file name) including a predetermined fixed name (such as "/km/") is described in page information 515a. At this point, it is necessary to assign a file name of the target image, which is stored as the common image in the predetermined location such as ROM 23.

[Advantageous Effect of First Embodiment]

As described above, in the first embodiment, the uniformity between the UI of the built-in application and the UI of the Web application is enhanced by utilizing the common image in the Web application. Therefore, the user who utilizes the Web application is hardly confused, the incorrect manipulation of the user can be prevented, and the convenience of image forming apparatus 1 is enhanced.

The common image is stored in image forming apparatus 1. Accordingly, the image data is quickly acquired while the load (traffic) on network 800 is reduced. It is not necessary that the image relevant to the common image be stored in Web server 501, so that a storage capacity necessary for Web server 501 can be decreased in the storage device.

When the common image is used, in page information 515a, it is not necessary to assign the URI indicating the exact location in which the common image is stored in image forming apparatus 1. The common image can easily be used by describing the URI including the fixed name "/km/" in page information 515a. In the plurality of image forming apparatuses 1, 201, and 301, even if the locations in each of which the common image is stored differs from one another, the location in which the common image is stored in each of image forming apparatuses 1, 201, and 301 may be set to the location correlating to the fixed name "/km/". Therefore, only Web server 501 provides common page information 515a, so that Web browser 53 can acquire the common image properly from each of image forming apparatuses 1, 201, and 301 to properly generate the display screen.

In registering the Web application in image forming apparatus 1, image data 515b existing in Web server 501 is stored in HDD 15 that is a local (client) side. In generating the display screen, image data 15d stored in HDD 15 is used according to the fixed name included in the page information without acquiring the image data from Web server 501. Accordingly, the image data is quickly acquired, and the display screen is quickly generated and displayed. The traffic of network 800 of image forming system 900 can be reduced.

Second Embodiment

Because a basic of the configuration of an image forming system 900 according to a second embodiment is substantially identical to that of the first embodiment, the description is not repeated. Image forming apparatus 1 of the second embodiment differs from image forming apparatus 1 of the first embodiment in processing that is performed in that case that the fixed name is included in the URI included in the page information. In the second embodiment, in the case that the fixed name is included in the URI, the data that is acquired from the predetermined location correlating to the fixed name is changed based on the result of the determination whether the Web application is certified.

In the second embodiment, Web browser 53 changes a certified logo image (certified display image) displayed on the display screen of the Web application based on whether the activated Web application is the certified application. Similarly to other images, the certified logo image is assigned by the IMG tag in page information 515a expressing the Web page of the Web application.

FIG. 15 is a view illustrating the URI included in page information 515a in the second embodiment.

Referring to FIG. 15, URI 701d is assigned while surrounded by the double quotation mark in IMG tag 700d. In page information 515a, IMG tag 700d is described in order to display the certified logo image on the display screen of the Web page of the Web application.

Fixed name 710 is included in URI 701d. When performing the processing to URI 701d, Web browser 53 refers to analysis table 15f similarly to the first embodiment. According to URI 701d, Web browser 53 acquires the image data from the predetermined directory correlating to fixed name 710 in ROM 23.

File name 750 of the certified logo image is included in URI 701d. For example, file name 750 of the certified logo image is called "km_certification_mark.gif". File name 750 of the certified logo image is previously registered in image forming apparatus 1 as a file name indicating the certified logo image.

Web browser 53 determines whether file name 750 of the certified logo image is included in URI 701*d*. When file name 750 of the certified logo image is included in URI 701*d*, Web browser 53 acquires the certified logo image indicated by URI 701*d* from the predetermined directory correlating to the fixed name based on whether the Web application is the certified application.

FIG. 16 is a view illustrating an example of the display image of the certified Web application.

The elements such as the button images displayed on display image 120 are omitted in FIG. 16. Referring to FIG. 16, the certified logo image is displayed in display image 120. When the Web application is certified, certification image 750*a* indicating "certified" is displayed as the certified logo image.

FIG. 17 is a view illustrating an example of the display image of the uncertified Web application.

The elements such as the button images displayed on display image 120 are omitted in FIG. 17. Referring to FIG. 17, when the Web application is uncertified, non-certification image 750*b* indicating "uncertified" is displayed as the certified logo image in display image 120.

FIG. 18 is a view illustrating the certified logo image.

IMG tag 700*d* indicating URI 701*d* relating to the certified logo image is included in page information 515*a*, thereby displaying certification image 750*a* and non-certification image 750*b*. When file name 750 of the certified logo image is included in URI 701*d*, Web browser 53 acquires the image data instead of file name 750 of the certified logo image. Web browser 53 acquires the pieces of image data having different names from the predetermined directory based on whether the Web application is certified.

Referring to FIG. 18, the two pieces of image data, namely, certification image 750*a* for the certified Web application (certified) and non-certification image 750*b* for the uncertified Web application (uncertified) are correlated to the previously-registered file name 750 ("km_certification_mark.gif") of the certified logo image. Certification image 750*a* is the image data in which the name is expressed by "certified.gif". On the other hand, non-certification image 750*b* is the image data in which the name is expressed by "uncertified.gif". When the Web application is certified for URI 701*d*, Web browser 53 acquires certification image 750*a* ("certified.gif") as the image data. When the Web application is uncertified for URI 701*d*, Web browser 53 acquires non-certification image 750*b* ("uncertified.gif") as the image data.

Both certification image 750*a* expressed by "certified.gif" and non-certification image 750*b* expressed by "uncertified.gif", which are the certified logo images, are the common images stored in the predetermined directory of ROM 23.

Figure 19:
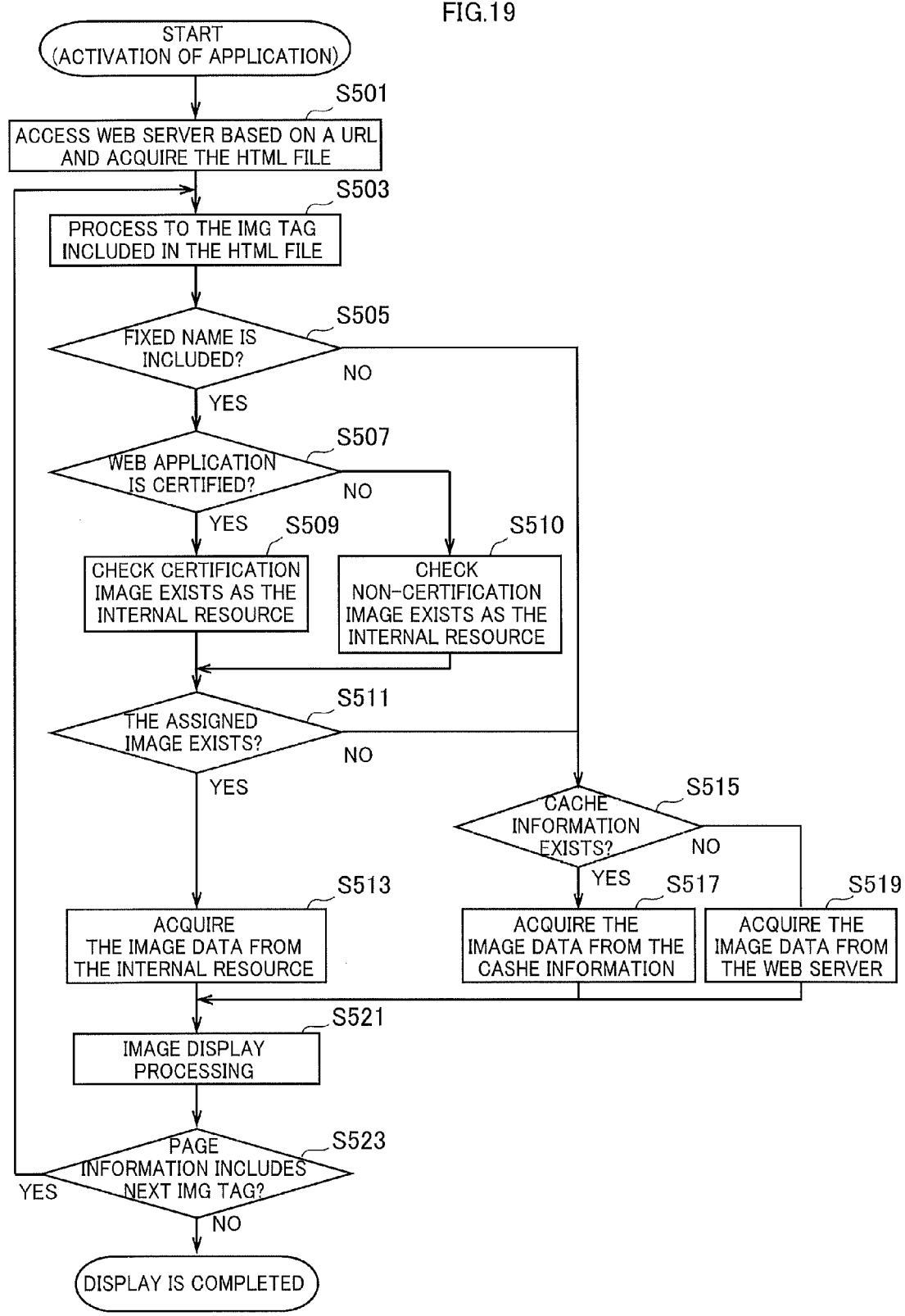
FIG. 19 is a flowchart illustrating an operation when activation of the Web application is started in the image forming apparatus of the second embodiment.

FIG. 19 is a flowchart illustrating an operation when the activation of the Web application is started in image forming apparatus 1 of the second embodiment.

In FIG. 19, Steps S501 to S507 are identical to Steps S401 to S407 of the first embodiment. Steps S511 to S523 are identical to Steps S411 to S423 of the first embodiment. The descriptions made in the first embodiment are omitted.

Referring to FIG. 19, in the case that the fixed name image is included in page information 515*a*, processing in Step S509 is performed when the Web application is the certified application in Step S507. That is, CPU 21 checks whether certification image 750*a* exists as the internal resource in the location correlating to the fixed name in image forming apparatus 1. CPU 21 checks whether the image data "certified.gif" that is certification image 750*a* exists in the predetermined directory of ROM 23.

On the other hand, processing in Step S510 is performed when the Web application is the uncertified application in Step S507. That is, CPU 21 checks whether non-certification image 750*b* exists as the internal resource in the location correlating to the fixed name in image forming apparatus 1. CPU 21 checks whether the image data "uncertified.gif" that is non-certification image 750*b* exists in the predetermined directory of ROM 23.

Because the acquired image data is different based on whether the Web application is the certified application, the display screen of the Web application is changed based on whether the Web application is the certified application.

In the second embodiment, the pieces of processing in Steps S515, S517, and S519 are performed only when the fixed name image is not included in Step S405 or when the assigned image does not exist in Step S411.

[Advantageous Effect of Second Embodiment]

In the second embodiment, the certified logo images of the plurality of kinds of the Web applications are displayed on the display screen with the uniformity based on whether the Web application is certified. Accordingly, the user can easily recognize whether the Web application is certified. It is not necessary that the certified logo image be stored in the server that provides each certified Web application, and the certified logo image can easily be displayed on the display screen by performing the predetermined description to page information 515*a*.

Even if the description relating to the certified logo image of page information 515*a* is not changed before and after a certain Web application is certified, the certified logo image displayed on the display screen of the Web application is changed. Accordingly, the certified logo image can properly be displayed while the load on the user is suppressed to a small level.

Third Embodiment

In a third embodiment, because a basic configuration of image forming system 900 is identical to that of the first embodiment, the overlapping description is omitted. Image forming apparatus 1 of the third embodiment differs from image forming apparatus 1 of the first embodiment in that the common image is acquired from another Web server different from Web server 501. In the third embodiment, when the fixed name is included in the URI, the data is acquired from another Web server different from Web server 501 according to the fixed name and the URI.

Figures 20, 21:
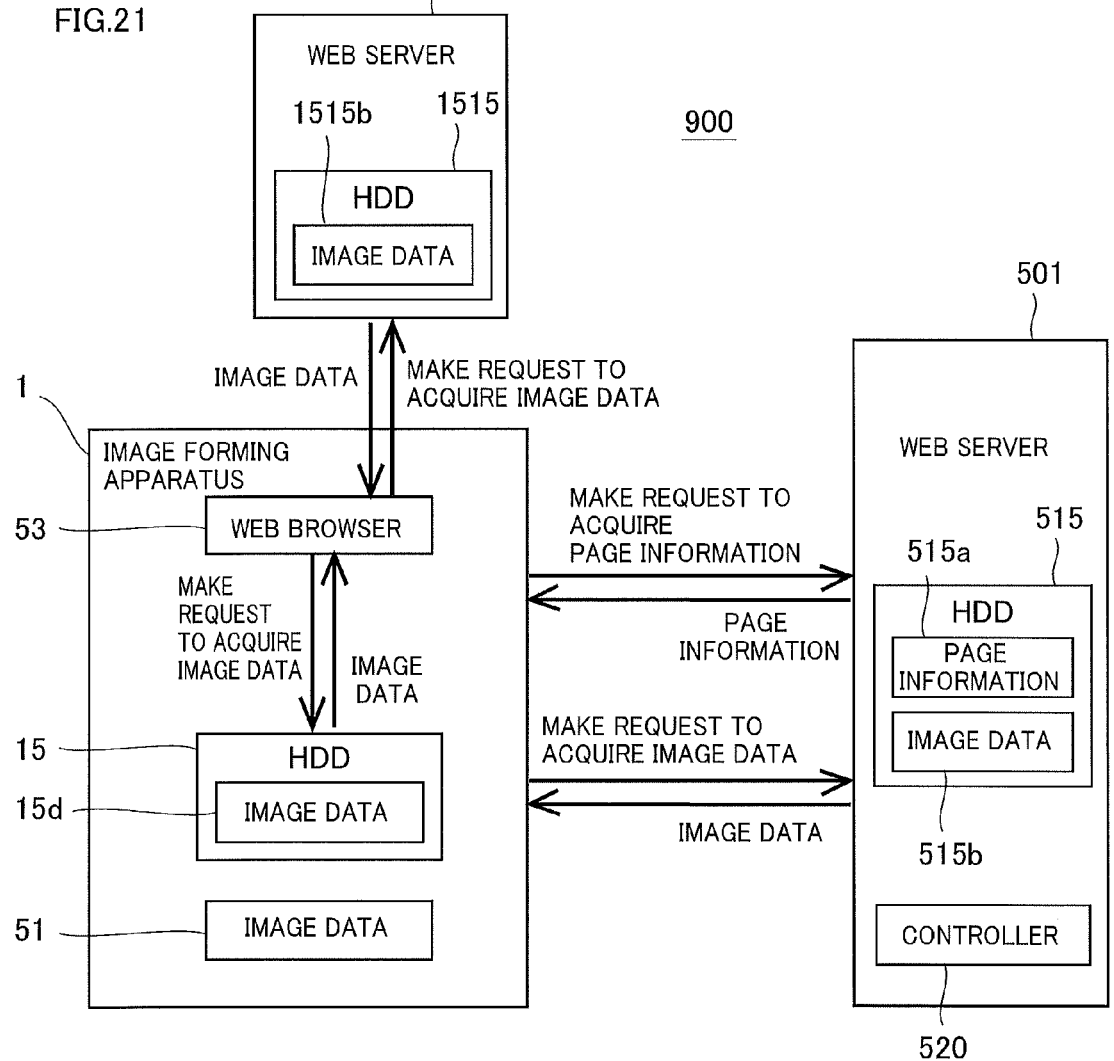
FIG. 20 is a view illustrating an example of an analysis table in a third embodiment.
FIG. 21 is a view illustrating an operation during the utilization of the Web application in the image forming system of the third embodiment.

FIG. 20 is a view illustrating an example of analysis table 15*f* in the third embodiment.

Referring to FIG. 20, analysis table 15*f* of the third embodiment differs from the analysis table (illustrated in FIG. 10) of the first embodiment in the following point. That is, "http://192.168.0.100/km/" is assigned as the location of the common image correlating to the fixed name "/km/". The common image is located in the predetermined location in external Web server 1501 (illustrated in FIG. 21) different from Web server 501.

FIG. 21 is a view illustrating an operation during the utilization of the Web application in image forming system 900 of the third embodiment.

Referring to FIG. 21, in image forming system 900, image forming apparatus 1 can conduct communication with Web server 501, and Web server 1501 different from Web server 501 through network 800.

HDD 1515 is provided in Web server 1501. Image data 1515*b* is stored in HDD 1515. The common image shared with various Web applications operating in image forming system 900 is included in image data 1515*b*. The same image as that used in the built-in application of image forming apparatus 1 is included as the common image. As illustrated in FIG. 20, the location in which image data 1515*b* is stored is previously set to the predetermined directory correlating to the fixed name "/km/" in analysis table 15*f* of image forming apparatus 1.

In the third embodiment, when the Web application is activated in image forming apparatus 1, Web browser 53 determines whether the predetermined fixed name is included as the URI indicating the image data in page information 515*a*. When the URI including the fixed name "/km/" exists, namely, when the URI indicating the common image exists, Web browser 53 acquires image data 1515*b* correlating to the URI from the predetermined directory correlating to the fixed name "/km/" in HDD 1515 of Web server 1501. Therefore, Web browser 53 can generate the display screen of the Web application including the common image and display the display screen on display panel 13 of image forming apparatus 1.

[Advantageous Effect of Third Embodiment]

In the third embodiment, the common image is acquired from Web server 1501 located on the outside of image forming apparatus 1. Accordingly, similarly to the same advantageous effect as the first embodiment, the uniformity between the UI of the built-in application and the UI of the Web application can be enhanced. The user who utilizes the Web application is hardly confused, the incorrect manipulation of the user can be prevented, and the convenience of image forming apparatus 1 is enhanced.

The image data relating to the common image may be stored in Web server 501. In this case, Web browser 53 can access Web server 501 to acquire the common image. Web server 1515 may be constructed such that another image forming apparatus (such as image forming apparatuses 201 and 301) different from image forming apparatus 1 acts as the Web server. In this case, the same common image as that used in the built-in application operating in another image forming apparatus may be displayed in the Web application.

The common image, which is stored in Web server 501 or another Web server 1501 and acquired by image forming apparatus 1, may be used in the built-in application of image forming apparatus 1. In this case, the image used in the UI can securely be uniformed between the built-in application of image forming apparatus 1 and the Web application. By changing the common image stored in Web servers 501 and 1501, the image used in the built-in application or the Web application can easily be switched while the uniformity is maintained.

When the URI including the fixed name exists, the data acquired according to the fixed name and the URI is not limited to the common image, but another piece of image data or another kind of data may be acquired.

[Other]

The image forming system may be constructed by a proper combination of technical matters of the first to third embodiments. In the case that the fixed name is included in the URI included in the page information, the data may be acquired from the predetermined location correlating to the fixed name. Therefore, the uniformity of the UI of the Web application operating in image forming apparatus 1 can be enhanced.

The data, which is stored in the predetermined location and acquired because of the existence of the URI including the fixed name is not limited to image data. For example, for various pieces of data such as a style sheet (such as a CSS (Cascading Style Sheet) and an XSL (Extensible Stylesheet Language)) of the Web page, the location in which the data is acquired may be changed based on whether the fixed name is included in the URI. Therefore, the uniformity of the UI of the Web application can easily be maintained.

Not only the processing of analyzing the page information on the utilization of the common data or the data stored in the image forming apparatus is performed to the page information on the Web application, but also the processing may be performed when the page information on another Web page is acquired.

The processing of analyzing the page information on the utilization of the common data or the data stored in the image forming apparatus may be performed even if an instruction to utilize the unregistered Web application is issued. Whether the user issues the instruction to utilize the Web application can be made based on whether the button displayed on the function selection screen is manipulated with respect to the registered Web application.

For example, the Web browser may determine whether the page information, which is acquired based on the user's instruction by the Web browser function, relates to the Web application. The processing of analyzing the page information acquired based on the user's instruction may be performed when the page information is specified by the URI indicating a predetermined form (for example, when the page information has a predetermined extension).

The processing of analyzing the page information on the utilization of the common data or the data stored in the image forming apparatus may be performed only when the instruction to utilize the registered the Web application is issued. When the user issues the instruction to utilize the Web application, whether the Web application is registered by the application management unit is made, and the analysis processing may be performed according to the determination result.

The URI included in the page information is not limited to the relative URI, but an absolute URI may be used. Even if the absolute URI is assigned, the above processing may be performed according to the fixed name when the fixed name is included in the absolute URI. The above processing may be performed according to the fixed name only when the relative URI is assigned while the fixed name is included in the relative URI, and the processing may not be performed when the absolute URI is assigned. That is, when the absolute URI is assigned, the data may be acquired from the location assigned by the absolute URI even if the fixed name is included.

The correspondence relationship between the fixed name and the predetermined location may be shared with the image forming system. For example, the analysis table indicating the correspondence relationship is stored in the Web server, the management apparatus, or another apparatus, and the image forming apparatus may specify the predetermined location correlating to the fixed name based on the analysis table acquired through the network.

The Web browser may not use the cache information irrespective of the existence or non-existence of the cache information. When the proper cache information exists, the Web browser may not acquire the data from the predetermined location correlating to the fixed name. In this case, the Web browser may acquire the data from the cache information.

The Web application is not limited to the above Web application. One Web application may be provided from the plurality of Web servers constituting the image forming system. The plurality of Web applications may be provided from one Web server. The Web application may be provided by the image forming apparatus having the server function.

The Internet may be used as the network that connects the Web server and the image forming apparatus in the communicable manner. Another device may be provided in the image forming system.

The image forming apparatus may be any of a black-and-white or color copier, printer, facsimile machine, or a multifunction peripheral (MFP) as a combination thereof. The image forming apparatus is not restricted to the one which forms images by electrophotography, but may be the one which forms images by a so-called inkjet system.

The processes according to the above embodiments may be performed by software or by using a hardware circuit.

A program for executing the processes according to the above embodiments may be provided as well. The program may be recorded on a recording medium, such as a CD-ROM, flexible disk, hard disk, ROM, RAM, memory card, or the like, so as to be provided to the user. The program may also be downloaded to the device via a communication line such as the Internet. The processes described in conjunction with the flowcharts above are executed by a CPU and the like in accordance with the program.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

According to the invention, for the URI including the fixed name, the data is acquired from the predetermined location correlated to the fixed name. Accordingly, the image forming apparatus and the image forming system for being able to easily maintain the uniformity of the UI of the image forming apparatus can be provided.

What is claimed is:

1. An image forming apparatus that accesses a server, which provides a Web application, to enable said Web application to be utilized, the image forming apparatus comprising:
a display; and
a processor configured to:
receive an instruction to utilize said Web application;
acquire a document expressing a Web page of said Web application in response to the instruction;
display a display screen on the display for the Web page with a first data designated by a URI (Uniform Resource Identifier) included in the document, the first data corresponding to an interface image of the Web application;
analyze whether a previously-set fixed name is included in a URI included in the document, wherein a common data is pre-stored in a predetermined location which is previously correlated to said fixed name, is used among a plurality of Web applications and is different from a location for the first data, the common data corresponding to an interface image of a predetermined application;
acquire the common data correlating to said URI from a predetermined location when it is analyzed that said fixed name is included in said URI; and
generate the display screen of said Web application replacing the first data with the common data as interface of said Web application.

2. The image forming apparatus according to claim 1, wherein the processor is further configured to:
register a Web application provided by said server;
acquire at least part of data, which is not common data stored in said image forming apparatus, when said Web application is registered, and storing the at least part of data in said image forming apparatus;
set a fixed name relating to the Web application registered by said registration unit while correlating to said fixed name with a location in which said data is stored
analyze whether the fixed name set is included in said URI; and
acquire said data from the storage location of said data correlated to said fixed name when it is analyzed that the fixed name is included in said URI.

3. The image forming apparatus according to claim 2, wherein said fixed name is set based on the instruction from said server.

4. The image forming apparatus according to claim 2, wherein, when said fixed name is set, information is transmitted on the set fixed name to said server.

5. The image forming apparatus according to claim 1, wherein a fixed name correlating to a location, in which at least part of said data is stored, in at least one of said server and another server is set as said fixed name, and
at least part of said data is acquired from one of said server and said another server according to said fixed name and said URI when it is analyzed that said fixed name is included in said URI.

6. The image forming apparatus according to claim 1, wherein a fixed name correlating to a location, in which a common data possibly shared with another application in said data is stored, in at least one of said server and another server is set as said fixed name, and
said common data is acquired from one of said server and said another server according to said fixed name and said URI when it is analyzed that said fixed name is included in said URI.

7. The image forming apparatus according to claim 1, wherein said common data is a common image identical to an image that is displayed during an operation of a built-in application of said image forming apparatus.

8. The image forming apparatus according to claim 7, wherein said common image is at least one of a background image, a button image, an icon image, and a certified display image of the Web page of said Web application.

9. The image forming apparatus according to claim 1, wherein the processor is further configured to determine whether the Web application provided by said server is certified, and
when it is analyzed that said fixed name is included in said URI, data acquired from said predetermined location is changed based on whether the Web application is determined as the certified application.

10. The image forming apparatus according to claim 1, wherein, when said data is acquired while data correlating to said URI is temporarily stored as cache data in said image forming apparatus, the acquired data rather than said cache data is preferentially used to generate the display screen.

11. The image forming apparatus according to claim 1, wherein, when said data is acquired while cache data temporarily stored in said image forming apparatus is set so as not to be used, the acquired data is used to generate the display screen.

12. The image forming apparatus according to claim 1, wherein it is analyzed whether said fixed name is included in a URI indicating an image in said URIs, and
the image correlating to said URI is acquired from said predetermined location when it is analyzed that said fixed name is included in said URI.

13. An image forming system comprising:
the image forming apparatus defined in claim 1; and a server for providing a Web application, wherein
said Web application can be utilized through said image forming system that accesses said server.

14. An image forming system comprising:
an image forming apparatus; and
a server for providing a Web application, said Web application being able to be utilized through said image forming apparatus that accesses said server, wherein
said image forming apparatus includes:
a registration unit for registering the Web application provided by said server;
a storage for acquiring at least part of data, which is not stored in said image forming apparatus in data used in said Web application, when said registration unit registers said Web application, and storing the at least part of data in said image forming apparatus;
a name setting unit for setting a fixed name relating to the Web application registered by said registration unit while correlating to said fixed name to a location in which said data is stored by said storage;
a receiving unit for receiving an instruction to utilize said Web application;
a document acquisition unit for acquiring a document expressing a Web page of said Web application from said server in response to the instruction received by said receiving unit;
an analysis unit for analyzing whether the fixed name set by said name setting unit is included in a URI (Uniform Resource Identifier) included in the document acquired by said document acquisition unit;
a data acquisition unit for acquiring data correlating to said URI from the storage location of said data correlated to said fixed name when said analysis unit determines that said fixed name is included in said URI; and
a generator for generating a display screen of said Web application based on said document using the data acquired by said data acquisition unit,
the server includes an instruction unit for issuing an instruction relating to the fixed name that should be set by said name setting unit to said image forming apparatus based on the URI relating to data stored in said image forming apparatus by said storage in the URIs included in the document expressing the Web page of said Web application when said registration unit registers said Web application in said image forming apparatus, and
the name setting unit sets said fixed name based on an instruction contents of said instruction unit.

15. An image forming system comprising:
an image forming apparatus; and
a server for providing a Web application, said Web application being able to be utilized through said image forming apparatus that accesses said server, wherein
said image forming apparatus includes:
a registration unit for registering the Web application provided by said server;
a storage for acquiring at least part of data, which is not stored in said image forming apparatus in data used in said Web application, when said registration unit registers said Web application, and storing the at least part of data in said image forming apparatus;
a name setting unit for setting a fixed name relating to the Web application registered by said registration unit while correlating to said fixed name to a location in which said data is stored by said storage;
a receiving unit for receiving an instruction to utilize said Web application;
a document acquisition unit for acquiring a document expressing a Web page of said Web application from said server in response to the instruction received by said receiving unit;
an analysis unit for analyzing whether the fixed name set by said name setting unit is included in a URI (Uniform Resource Identifier) included in the document acquired by said document acquisition unit;
a data acquisition unit for acquiring data correlating to said URI from the storage location of said data correlated to said fixed name when said analysis unit determines that said fixed name is included in said URI; and
a generator for generating a display screen of said Web application based on said document using the data acquired by said data acquisition unit,
said name setting unit, when setting said fixed name, transmits information on the set fixed name to said server,
the server includes:
a name acquisition unit for acquiring the information of said fixed name transmitted from said name setting unit; and
a document changing unit for changing the document expressing the Web page of said Web application based on the information acquired by said name acquisition unit, and
said document changing unit changes the URI relating to data stored in said image forming apparatus by said storage in the URIs included in said document such that said fixed name is included in the URI relating to the data.

16. A method for controlling an image forming apparatus that accesses a server, which provides a Web application, to enable said Web application to be utilized, the method comprising the steps of:
receiving an instruction to utilize said Web application;
acquiring a document expressing a Web page of said Web application in response to the instruction received in said receiving step;
displaying a display screen on a display for the Web page with a first data designated by a URI (Uniform Resource Identifier) included in the document, the first data corresponding to an interface image of the Web application;
analyzing whether a previously-set fixed name is included in a URI included in the document acquired in said document acquisition step, wherein a common data is pre-stored in a predetermined location which is previously correlated to said fixed name, is used among a plurality of Web applications and is different from a location for the first data, the common data corresponding to an interface image of a predetermined application;
acquiring the common data correlating to said URI from a predetermined location when in analysis step, it is analyzed that said fixed name is included in said URI; and
generating the display screen of said Web application replacing the first data with the common data acquired in said data acquisition step as interface of said Web application.

17. A non-transitory computer-readable recording medium encoded with a program for controlling an image forming apparatus that accesses a server, which provides a Web application, to enable said Web application to be utilized, the program causing a computer to execute process comprising:
receiving step of receiving an instruction to utilize said Web application;

document acquisition step of acquiring a document expressing a Web page of said Web application in response to the instruction received in said receiving step;

displaying step of displaying a display screen on a display for the Web page with a first data designated by a URI (Uniform Resource Identifier) included in the document, the first data corresponding to an interface image of the Web application;

analysis step of analyzing whether a previously-set fixed name is included in a URI included in the document acquired in said document acquisition step, wherein a common data is pre-stored in a predetermined location which is previously correlated to said fixed name, is used among a plurality of Web applications and is different from a location for the first data, the common data corresponding to an interface image of a predetermined application;

data acquisition step of acquiring the common data correlating to said URI from a predetermined location when in said analysis step, it is analyzed that said fixed name is included in said URI; and generating step of generating the display screen of said Web application replacing the first data with the common data acquired in said data acquisition step as interface of said Web application.

* * * * *